United States Patent
Tuffreau et al.

(10) Patent No.: US 10,410,377 B2
(45) Date of Patent: Sep. 10, 2019

(54) COMPRESSING A SIGNAL THAT REPRESENTS A PHYSICAL ATTRIBUTE

(71) Applicant: DASSAULT SYSTEMES, Velizy Villacoublay (FR)

(72) Inventors: Jean-Julien Tuffreau, Issy-les-Moulineaux (FR); Malika Boulkenafed, Courbevoie (FR)

(73) Assignee: DASSAULT SYSTEMS, Velizy Villacoublay (FR)

( * ) Notice: Subject to any disclaimer, the term of this patent is extended or adjusted under 35 U.S.C. 154(b) by 59 days.

(21) Appl. No.: 15/702,042

(22) Filed: Sep. 12, 2017

(65) Prior Publication Data
US 2018/0075622 A1    Mar. 15, 2018

(30) Foreign Application Priority Data

Sep. 13, 2016 (EP) .................................. 16306158

(51) Int. Cl.
| | |
|---|---|
| *G06K 9/00* | (2006.01) |
| *G06T 9/40* | (2006.01) |
| *G06T 9/00* | (2006.01) |
| *H04N 19/63* | (2014.01) |

(52) U.S. Cl.
CPC ............... *G06T 9/40* (2013.01); *G06T 9/001* (2013.01); *H04N 19/63* (2014.11)

(58) Field of Classification Search
None
See application file for complete search history.

(56) References Cited

U.S. PATENT DOCUMENTS

| | | | |
|---|---|---|---|
| 2002/0034337 A1* | 3/2002 | Shekter | G06K 9/40 382/275 |
| 2005/0196060 A1* | 9/2005 | Wang | H04N 19/63 382/240 |

OTHER PUBLICATIONS

Cha Zhang, et al.; "Point Cloud Attribute Compression with Graph Transform"; Microsoft Research; One Microsoft Way, Redmond, WA 98075; 5 pages.
Office Action dated Mar. 22, 2017, in Europe Patent Application No. 16306158.3-1502; 7 pages.
Ricardo L. de Queiroz, et al.; "Compression of 3D Point Clouds Using a Region-Adaptive Hierarchical Transform"; IEEE Transactions on Image Processing; vol. 25, No. 8; Aug. 2016; 10 pages.
Chandrajit L. Bajaj, et al.; "Single Resolution Compression of Arbitrary Triangular Meshes with Properties"; Computational Geometry 14 (1999); 20 pages.

(Continued)

*Primary Examiner* — Atiba O Fitzpatrick
(74) *Attorney, Agent, or Firm* — Oblon, McClelland, Maier & Neustadt, L.L.P.

(57) ABSTRACT

The invention notably relates to a computer-implemented method for compressing data representing values of a physical attribute in a predetermined space. The method comprises providing a signal that includes a mapping from leaf cells of a hierarchical subdivision of the predetermined space each onto a respective coefficient representative of a value of the physical attribute at the respective leaf cell. The method also comprises determining a discrete wavelet transform of the signal and encoding the determined discrete wavelet transform. The method provides an improved way to compress a modeled object that represents a real object.

14 Claims, 4 Drawing Sheets

(56) References Cited

OTHER PUBLICATIONS

Mario Botsch, et al.; "Efficient High Quality Rendering of Point Sampled Geometry"; Thirteenth Eurographics Workshop on Rendering (2002); 12 pages.
Zhiyan Du, et al.; "Out-of-Core Progressive Lossless Compression and Selective Decompression of Large Triangle Meshes"; 10 pages.
Jarek Rossignac; "Edgebreaker: Connectivity Compression for Triangle Meshes"; GVU Technical Report GIT-GVU-98-35 (revised version of GIT-GVU-98-17); 15 pages.
Jarek Rossignac; "Edgebreaker: Connectivity Compression for Triangle Meshes"; 1999 IEEE; Reprinted With Permission From IEEE Transactions on Visualization and Computer Graphics; vol. 5, No. 1; 1999; 17 pages.
Jarek Rossignac, et al.; "Edgebreaker on a Corner Table: A Simple Technique for Representing and Compressing Triangulated Surfaces"; College of Computing and GVU Center; Georgia Institute of Technology; 7 pages.
J. M. Shapiro; "Embedded Image Coding Using Zerotrees of Wavelet Coefficients"; IEEE Trans. Signal Processing; Dec. 1993; 3 pages.
Pierre-Marie Gandoin, et al.; "Progressive Lossless Compression of Arbitrary Simplicial Complexed"; HAL Archives-Ouvertes.FR; 20 pages.
Yan Juang, et al.; "A Generic Scheme for Progressive Point Cloud Coding"; IEEE Trans VIS Comput Graph; IEEE Trans VIS Comput Graph; Mar.-Apr. 2008; 1 page.
Clement Jamin, et al.; "CHuMI Viewer: Compressive Huge Mesh Interactive Viewer"; Preprint Submitted to Computer & Graphics; May 4, 2009; 12 pages.
Wenfei Jiang, et al.; "Tangent-Plane-Continuity Maximization Based 3D Point Compression"; $19^{th}$ IEEE International Conference on Image Processing (ICIP); Sep. 30-Oct. 3, 2012; Orlando, FL; 1 page.
J. Kammerl, et al.; "Real-Time Compression of Point Cloud Streams"; IEEE International Conference on Robotics and Automation (ICRA); May 14-18, 2012; Saint Paul, MN; 1 page.
Thomas Lewiner, et al.; "GEncode: Geometry-Driven Compression for General Meshes"; Submitted to Computer Graphics Forum (Apr. 2006); vol. XX (200y), No. 7; 10 pages.
Wim Sweldens; "The Lifting Scheme: A Construction of Second Generation Wavelets"; To Appear in SIAM Journal on Mathematical Analysis; May 1995, Revised Nov. 1996; 42 pages.
Adrien Maglo, et al.; "3D Compression: Survey, Comparisons and Emerging Trends"; ACM Computing Surveys; vol. 9; No. 4, Article 39; Publication date: Sep. 2013; 40 pages.
Yan Huang, et al.; "Octree-Based Progressive Geometry Coding of Point Clouds"; Eurographics Symposium on Point-Based Graphics (2006); 9 pages.
Jingliang Peng, et al.; "Geometry-Guided Progressive Lossless 3D Mesh Coding with Octree (OT) Decomposition"; University of Southern California; ACM Trans. On Graphics; vol. 24, No. 3; Jul. 2005; 8 pages.
Amir Said, et al.; "A New, Fast, and Efficient Image Codec Based on Set Partitioning in Hierarchical Trees" IEEE Transactions on Circuits and Systems for Video Technology; vol. 6, No. 3, Jun. 1996; 8 pages.
Ruwen Schnable, et al.; "Octree-Based Point-Cloud Compression"; Eurographics Symposium on Point-Based Graphics (2006); M. Botsch, B. Chen (Editors); 11 pages.
Gabriel Taubin, et al.; "Geometric Compression Through Topological Surgery"; ACM Transactions on Graphics; vol. 17, No. 2; Apr. 1998; 32 pages.
Jiang Tian, et al.; "Adaptive Coding of Generic 3D Triangular Meshes Based on Octree Decomposition"; The Visual Computer; Jun. 2012; vol. 28, Issue 6, First Online: April 18, 2012; 1 page.

* cited by examiner

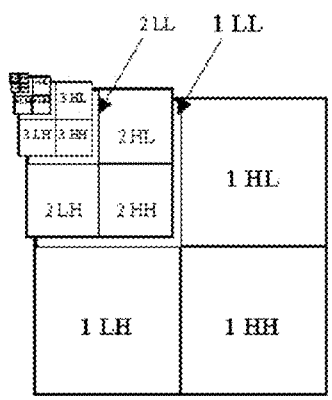
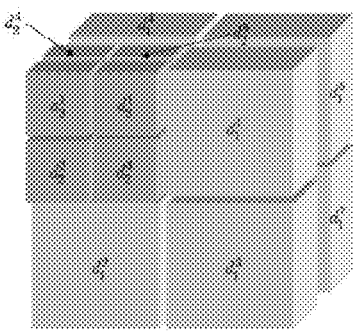
FIG. 6
FIG. 7
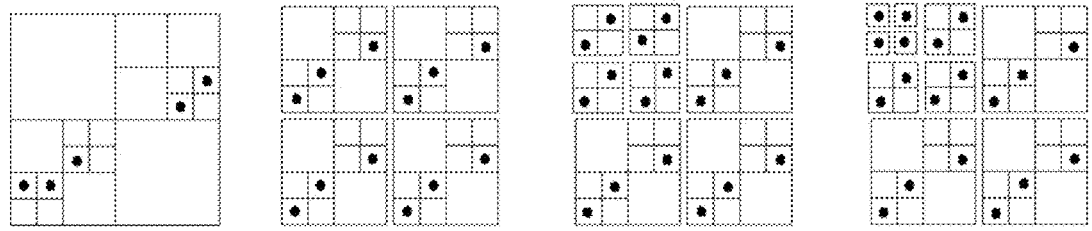
FIG. 8
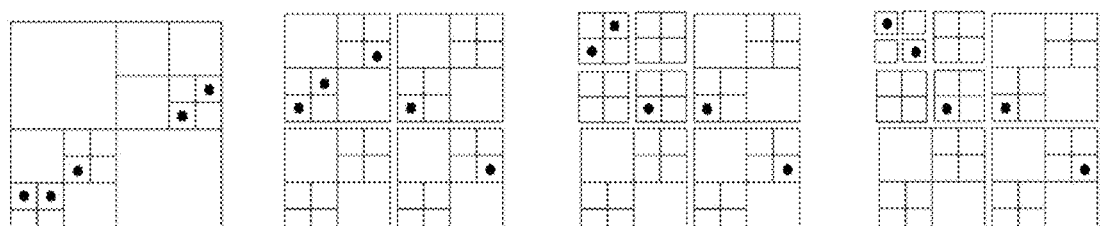
FIG. 9

COMPRESSING A SIGNAL THAT REPRESENTS A PHYSICAL ATTRIBUTE

CROSS-REFERENCE TO RELATED APPLICATIONS

This application claims priority under 35 U.S.C. § 119 or 365 to European Application No. 16306158.3, filed Sep. 13, 2016. The entire teachings of the above application(s) are incorporated herein by reference.

FIELD OF THE INVENTION

The invention relates to the field of computer programs and systems, and more specifically to a method, system and program for compressing and/or decompressing a signal that represents values of a physical attribute in a predetermined space, and to such a compressed signal.

BACKGROUND

A number of systems and programs are offered on the market for the design, the engineering and the manufacturing of objects. CAD is an acronym for Computer-Aided Design, e.g. it relates to software solutions for designing an object. CAE is an acronym for Computer-Aided Engineering, e.g. it relates to software solutions for simulating the physical behavior of a future product. CAM is an acronym for Computer-Aided Manufacturing, e.g. it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise. The PLM solutions provided by Dassault Systèmes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

In this context, particle-based applications (e.g. point cloud rendering, fluid simulation with SPH—such as smoothed-particle hydrodynamics) or 3D modeling can benefit from data compression. Thus, methods have been developed to perform data compression applied to a large number of particles spread in a 3D (or 2D) space. Such prior art is mainly covered by two fields of research. The first field is geometry driven compression of 3D (or 2D) meshes. The second field is compression of point clouds.

The first field (mesh compression) is now discussed.

A very large number of methods have been proposed to compress 3D meshes. A 3D mesh usually consists of geometry data (e.g. position of each vertex of the mesh in a space), connectivity data (e.g. the incidence relations between vertices, i.e. how vertices are linked to form polygonal faces), and optionally per-vertex and/or per-face attributes (i.e. value of at least one physical attribute associated to the vertex/face position, e.g. vertex/face properties useful for the application, e.g. colors, normal vectors, and/or texture coordinates). A relatively comprehensive taxonomy of these methods can be found in the paper "*3D mesh compression: survey, comparisons and emerging trends*" by Maglo et al., 2013. One can basically identify two main branches.

The first branch relates to connectivity compression methods. These methods mainly use connectivity data to encode both connectivity data and the vertex information. The algorithms Edgebreaker (by Rossignac), Layered decomposition (by Bajaj) and Spanning trees (by Taubin and Rossignac) are good examples. These methods achieve good results, because connected vertices have close positions and attribute values. This can be exploited favorably by the compression scheme: one can predict a vertex position/attribute value if one has already decoded those connected to it (e.g. so-called "parallelogram prediction" scheme in the Edgebreaker algorithm).

The second branch relates to geometry-driven compression methods. In this branch, geometry data (and other vertex attributes) are compressed first without regard to the connectivity. Connectivity is compressed afterwards by using the geometry data. The idea of such methods is that connectivity data represent only a small part of the data compared to vertex position/other attributes in very large 3D meshes. Such methods thus believe it more relevant to handle geometry data more carefully. Most state-of-the-art geometry-driven compression schemes are based on space partitioning. That means vertices are partitioned in hierarchical structures like BSP, K-d tree or octree (quadtree in 2D). Few examples of methods that use a K-d tree to encode vertex positions include: the paper "*GEn-code: Geometry-driven compression for General Meshes*", by Lewiner & al. (2006), and the paper "*Progressive lossless compression of arbitrary simplicial complexes*", by Gandoin a Devilliers (2002). Examples of methods that use an octree to encode vertex positions include: the paper "*Geometry-guided progressive lossless 3D mesh coding with octree decomposition*", by Peng & al. (2005), the paper "*Adaptive coding of generic 3D triangular meshes based on octree decomposition*", by Tian & al. (2012), the paper "*CHuMI viewer: Compressive huge mesh interactive viewer*", by Jamin & al. (2009), and the paper "*Out-of-Core Progressive Lossless Compression and Selective Decompression of Large Triangle Meshes*", by Dii & al, (2009).

The second field (point cloud compression) is now discussed.

Point clouds only include geometry data (vertex positions) and per-vertex attributes (e.g. a color and/or a normal vector per vertex). Point clouds often consist of very large data and compression is therefore a critical matter. State-of-the-art compression methods are also based on space partitioning: this provides good results and sometimes allows vertex random access (another matter of interest for point clouds). The following methods are all based on octree decomposition: the paper "*Efficient high quality rendering of point sampled geometry*", by Botsch & al., the paper "*Octree-based Point-Cloud Compression*", by Schnabel & Klein, the paper "*A Generic Scheme for Progressive Point Cloud Coding*", by Huang & al., the paper "*Octree-Based Progressive Geometry Coding of Point Clouds*", by Huang & al., the paper "*Tangent-plane-continuity maximization based 3d point compression*", by Julang & al., the paper "*Real-time compression of point cloud streams*", Kammeri & al, and the paper "*Point cloud attribute compression with graph transform*", by Zha ng & al.

Most of these methods consist of two steps. First, partitioning space in an octree so that each leaf contains 0 or 1 (or a few) vertex(ices) and each leaf containing a vertex has small dimensions. Thus knowing the position of the cell in the tree gives enough precision to locate the vertex in the 3D space. Then, a method to encode efficiently the tree structure and whose leaves are empty or not. This information is enough to recover vertex positions.

Whether they lie in the first field or in the second field, the compression methods listed above spare no effort or ingenuity to increase efficiency. Efficiency can be assessed with any one or any tradeoff of the following criteria: compression ratio, compression and decompression time, progressiveness, data random access, and temporal correlation. Compression ratio is the ratio between the size of the data after compression and before compression. It is a concrete, quantified measure and usually the first way to assess efficiency. Compression and decompression time are also solid and quantified measures for assessing efficiency. Decompression time is often more relevant, as real 3D applications need to load and to decompress data in real-time, but such data might have been compressed offline (once and for all). Memory consumption might also be taken into account as it is strongly related to the question of whether it can work in real-time. Progressiveness is the ability to load the data partially and to get something already useable. The partially loaded data may be displayed as a coarse version of the final result, and further loading only adds smaller (and smaller) details. Data random access is the ability to load a small well-located part of the data without having to read/load other parts (or in a minimum of time). Temporal correlation, if the data is animated over time, is the ability to exploit correlation between frames (i.e. state of the data at different times) to further compress the data.

Despite their many efforts, most of the methods listed above heavily focus on the efficiency of coding the 3D point positions instead of their attributes. These attributes are critical in rendering the point cloud/3D model with high quality. The size of these vertex attributes is also significant compared to the size of vertex positions.

Some methods still provide valid solutions, yet not efficient enough:

- The paper "*A Generic Scheme for Progressive Point Cloud Coding*" by Huang & al. teaches to encode colors (a per-vertex attribute) with a linear de-correlation transform followed by adaptive quantization along each transformed axis. While this scheme is fast, it can only achieve coding efficiency similar to an octree-based method.
- The paper "*Octree-based Point-Cloud Compression*" by Huang & al. teaches to encode positions and colors in separate octree structures.
- The paper "*Point cloud attribute compression with graph transform*" by Zhang & al. focuses on compression of vertex attributes and introduces a method based on "graph transform".

The main difficulty is that, unlike traditional images and videos where the attributes (e.g. pixel color) lie on a completely regular (e.g. grid like) structure, in this case, attributes lie on an unstructured and/or sparse point cloud, and are thus difficult to compress.

Within this context, there is still a need for an improved way to compress a modeled object that represents a real object.

SUMMARY OF THE INVENTION

It is therefore provided a computer-implemented method for compressing data representing values of a physical attribute in a predetermined space. The method comprises providing a signal that includes a mapping from leaf cells of a hierarchical subdivision of the predetermined space each onto a respective coefficient representative of a value of the physical attribute at the respective leaf cell. The method also comprises determining a discrete wavelet transform of the signal with a predetermined basis of wavelet convolution filters, thereby recursively determining subbands, including a low-pass subband, by passing, at each current recursion, each wavelet convolution filter over the low-pass subband of the previous recursion, starting from the signal. The subbands determined at a current recursion each include a respective mapping from leaf cells, of a same hierarchical subdivision of which the hierarchical subdivision of the previous recursion is a subdivision, each given leaf cell being mapped onto a respective coefficient determined, during the passing of a respective wavelet convolution filter over the low-pass subband of the previous recursion, by applying the respective wavelet convolution filter to the coefficients of the low-pass subband of the previous recursion mapped onto from leaf cells of the hierarchical subdivision of the previous recursion that subdivide the given leaf cell. The method also comprises encoding the determined discrete wavelet transform.

The method may comprise one or more of the following:
- the wavelet convolution filters have a compact support;
- at least at one given recursion the passing encounters at least one leaf cell of the low-pass subband of the previous recursion mapped onto no coefficient, the determining of a discrete wavelet transform including assigning a value to the encountered cell, the assigned value being inputted to each of the wavelet convolution filters;
- the assigned value is determined with respect to a criterion related to forcing one or more zeros in the subbands determined at the given recursion;
- the criterion is that the number of coefficients of all the subbands determined at the given recursion not forced to zero is equal to the number of coefficients of the ow-pass subband of the previous recursion not forced to zero;
- the size of the compact support is smaller or equal to the minimal value of the divider of the hierarchical subdivision; and/or
- the divider of the hierarchical subdivision has a constant value and the size of the compact support is equal to the constant value of the divider of the hierarchical subdivision.

It is also provided a compressed signal obtainable by the above compression method. Such a compressed signal represents values of the physical attribute in a predetermined space, and notably at leaf cells of the initial hierarchical subdivision, but it takes less memory space than the initial mapping (the adjective "initial" referring to the initial signal, that is, the signal as it is before the discrete wavelet transform). The compressed signal indeed comprises the encoded discrete wavelet transform, thereby including the data representative of the result of encoding a hierarchical organization of subbands stemming from the discrete wavelet transform. The compressed signal may further comprise additional information that indicates leaf cells of the initial hierarchical subdivision from which a coefficient is mapped onto in the initial signal. Such additional information may be the data representing the initial mapping itself, but discarding (only) in the initial data the data that provides the coefficient values. The coefficient values are indeed provided in the compressed signal in a reduced size version: the encoded discrete wavelet transform.

It is also provided a computer-implemented method for decompressing a compressed signal obtainable by the above compression method. The compressed signal may be effectively obtained by the above compression method. The compression and decompression may thus be executed sequentially in a compression-then-decompression global process. The compressed signal may however be obtained by other compression methods, provided that they lead to the same compression format. The decompression may consist in reverting the computations executed for performing the compression, so as to retrieve the initial signal from the discrete wavelet transform, as known per se, with options discussed later. The decompression may thereby comprise decoding the compressed signal, and then reverting (i.e. executing the inverse of) the discrete wavelet transform.

In examples, the decompression may lead to coefficients that were not present in the initial signal, that is, coefficients that are mapped onto from leaf cells that did not map onto any coefficient before the compression. The decompression may comprise determining whether a coefficient was initially present or not, for each coefficient stemming from the decompression. This may be based on additional information present in the compressed signal, for example the above-mentioned additional information. The decompression may comprise discarding coefficients that were not initially present.

It is also provided a computer-implemented method that comprises a use of the signal, for example, a display of a representation and/or a computation and/or a simulation performed based on the mapping. The use may be performed in a global process after the decompression, and/or before the compression.

It is also provided a computer program comprising instructions for performing the compression method, the decompression method and/or the use.

It is also provided a computer readable storage medium having recorded thereon the computer program and/or the compressed signal.

It is also provided a system comprising a processor coupled to a memory, the memory having recorded thereon the computer program and/or the compressed signal.

BRIEF DESCRIPTION OF THE DRAWINGS

Embodiments of the invention will now be described, by way of non-limiting example, and in reference to the accompanying drawings, where:
FIGS. 3, 4, 5, 6, 7, 8, 9, 10 and 11 illustrate the method.

DETAILED DESCRIPTION OF THE INVENTION

Figure 1:
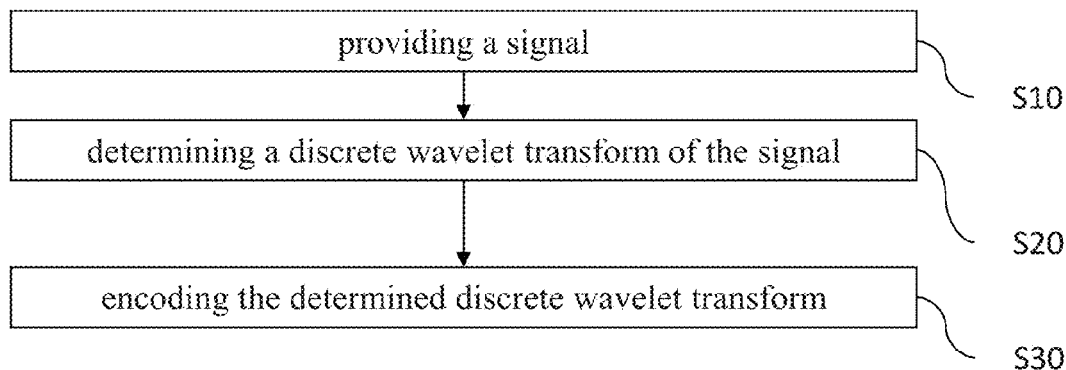
FIG. 1 shows a flowchart of an example of the method.

With reference to the flowchart of FIG. 1, it is proposed a computer-implemented method for compressing data representing values of a physical attribute in a predetermined space (i.e. processing said data such that the size of the data on memory storage is reduced, e.g. at least statistically, e.g. while losing relatively little or no information). The method comprises providing S10 a signal representative of values of the physical attribute each at a respective leaf cell of a hierarchical subdivision of the predetermined space. The method also comprises determining S20 a discrete wavelet transform of the signal with a predetermined basis of wavelet convolution filters. The discrete wavelet transform is performed based on the data structure of the signal, notably in accordance with the hierarchical subdivision structure. In other words, the structure of the recursion underlying the discrete wavelet transform follows the structure of the hierarchical subdivision. Yet in other words, the discrete wavelet transform comprises determining subbands in a sequence that corresponds to rewinding the hierarchical subdivision structure, starting from the leaf cells. The method then comprises encoding S30 the discrete wavelet transform determined at S20, e.g. in any way, e.g. for example in a lossless way. Optionally, the method may also comprise, before the encoding S30, quantizing the coefficients resulting from the wavelet transform in any classical way (e.g. which makes the compression lossy at such stage but allows to increase the compression ratio). Such a method improves the field of compression of data representing values of a physical attribute in a predetermined space.

First, the discrete wavelet transform of the physical attribute encoded at S30 results in a data structure that forms a compression (i.e. a compressed version) of the original data and of the initial signal (e.g. which original data and/or initial signal may thus be discarded/deleted after the method, e.g. from non-volatile memory where the signal is initially stored or from any data that form a modeled object under process by the method and for example to be sent to a distant system, e.g. the method being involved in a process of compressing the data that define a modeled object on the non-volatile memory and/or sending a compression of the modeled object to a distant system—e.g. a distinct workstation—thereby saving bandwidth). Thus, the method provides a new compression that may build upon any other compression scheme and thereby increase efficiency of such other compression scheme, and notably the compression ratio. Furthermore, in examples, the compression is lossless, at least at the stage of the determining S20.

Also, the method may transform and encode a signal that represents a physical attribute distinct from a set of locations, a set of positions or a shape representation of a real object. Indeed, the method provides a signal in the form of coefficients mapped onto a set of locations, that is, the leaf cells of the hierarchical subdivision. The set of locations is thereby already provided by the hierarchical subdivision data structure, and the coefficients provided by the mapping may thus convey additional information that goes beyond the mere set of locations, in which case the method compresses such additional information. The method thus improves on prior art methods that merely focus on compressing positioning data.

The fact that it is a discrete wavelet transform in specific which is eventually encoded proves particularly efficient. Indeed, the use of a wavelet compression scheme allows the method to achieve a relatively high compression ratio. Notably, physical attribute values (e.g. standard attributes, such as vertex color or per-vertex normal vectors) have a good space correlation, which is well taken into account by a wavelet compression scheme. In an example, the value of the physical attribute has a space correlation above a predetermined threshold. Furthermore, the use of a wavelet compression scheme allows the method to be relatively fast. Notably, the determining S20 and/or the encoding S30 can be parallelized (e.g. and implemented on a GPU).

Also, discrete wavelet transform coefficients (outputs of S20) may be sorted into frequency subbands. Yet, the method may perform the encoding S30 according to well-known wavelet-directed encoding schemes, such as EZW (described in paper "*Embedded image coding using* zerotrees of wavelets", by Shapiro) or SPIHT (described in paper "A new fast and efficient image codec based on set partitioning in hierarchical trees", by Said & Pearlman), which are naturally designed to provide progressiveness, or other encoding schemes configured to provide progressiveness (as known per se).

Then, the attribute data are not transformed considered in a raw way (e.g. as an unstructured set of values). Rather, physical attribute coefficients are associated to the hierarchical subdivision (which is itself associated to the predetermined space where the signal is provided), and said specific structure is involved in the transform in a way that achieves compression efficiency because space continuity of the physical attribute is exploited. Thanks to the method performing the determining S20 based on the hierarchical subdivision, the method takes into account the irregular and/or sparse structure of the leaf cells and thus of the coefficients representative of a value of the physical attribute mapped therefrom. Indeed, the hierarchical subdivision does not define a regular grid-like structure, that is, with its leaf cells being all at the same level and/or all non-empty, such that the set of coefficients does not define a perfect continuum of values for the physical attribute in the predetermined space. Still, the method accounts for high space correlation, said correlation being due to the fact that the data being compressed are the values of a physical attribute. In other words, the method handles the discontinuities while taking into account correlation where there is continuity. Thus, the method achieves a relatively high compression efficiency. To sum up, the method may apply efficiently the wavelet compression paradigm to an irregular and/or sparse case.

It is furthermore noted that a straightforward adaptation of the specific way a wavelet transform can be determined (e.g. in a 2D image case of the prior art) would be inefficient, compared to examples of the method of FIG. 1. For example, associating zero values to empty space (where there is no physical attribute) would be less efficient than examples of the method, as discontinuities would be created. Also, a polynomial interpolation of the physical attribute before the determining S20 of the wavelet transform would be relatively long to perform. Examples of the method instead do not introduce discontinuities that depreciate the compression ratio and thus perform relatively fast.

In examples, the method comprises provision of original data (via signal acquisition, e.g. with one or more physical sensors, such as an RGB-depth camera and/or a structure-from-motion analysis device and/or any other sensing device) in the form of a point cloud or a 3D mesh where each discrete position or element is associated to one value of the physical attribute, and the method processes such raw data, i.e. without completing it (e.g. by zeros and/or polynomial interpolation values). In other words, the coefficients included in the signal compressed by the method are all values of the raw acquired data (e.g. and inversely all or most—for example at least 75% —values of the raw acquired data become a coefficient of the signal provided at S10 to be compressed).

Moreover, the way the compression is performed allows a fast decompression (such a decompression method stemming straightforwardly from the way the compression is performed, as known per se from the field of wavelet transform data compression). In the following, the expression "the method" may sometimes refer to the decompression method.

The method is computer-implemented. This means that the steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined. For instance, the signal or data from which it is determined may be provided by a user (e.g. retrieved from a memory and/or designed/constructed), and the method may then be run fully automatically to compress the signal (e.g. possibly after the user has launched a specific software functionality, e.g. a "compression command").

A typical example of computer-implementation of the method is to perform the method with a system adapted for this purpose. The system may comprise a processor coupled to a memory (e.g. and to a graphical user interface, i.e. GUI), the memory having recorded thereon a computer program comprising instructions for performing the method. The memory may also store a database. The memory is any hardware adapted for such storage, possibly comprising several physical distinct parts (e.g. one for the program, and possibly one for the database).

Figure 2:
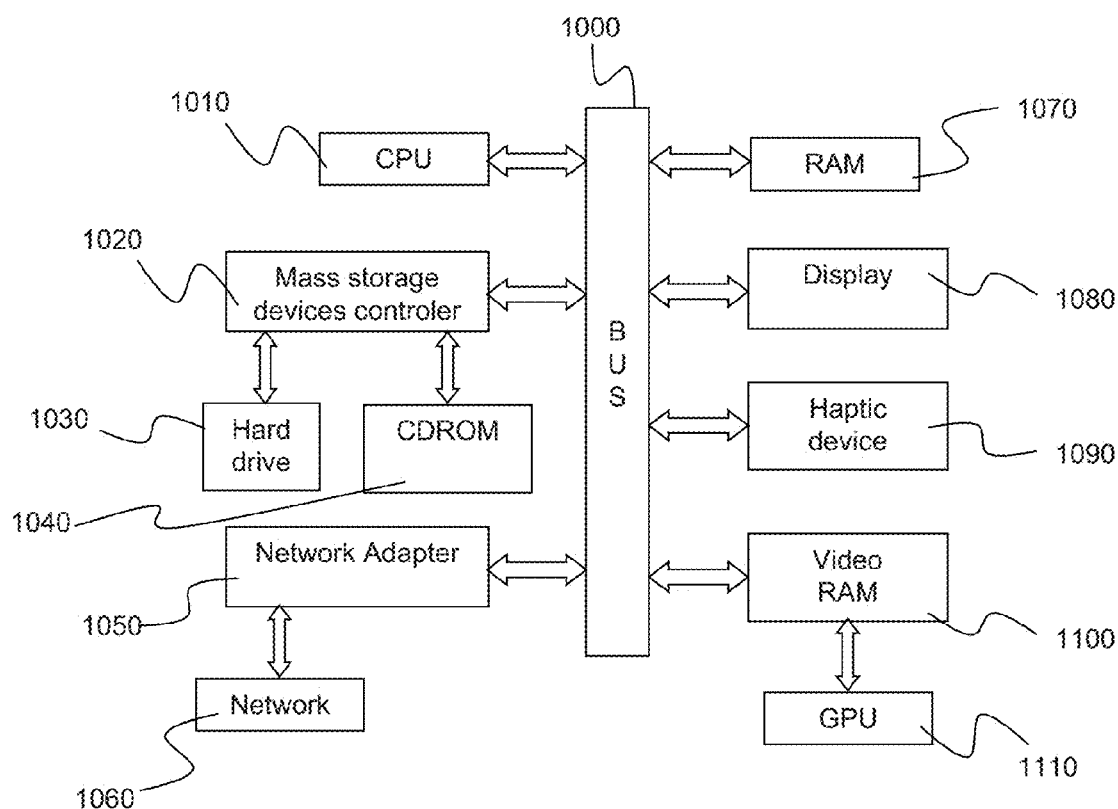
FIG. 2 shows an example of the system.

FIG. 2 shows an example of the system, wherein the system is a client computer system, e.g. a workstation of a user.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

The method may generally manipulate modeled objects and compress physical attribute signals thereof. A modeled object is any object defined by data stored e.g. in the database. By extension, the expression "modeled object" designates the data itself. According to the type of the system, the modeled objects may be defined by different kinds of data. The system may indeed be any combination of a CAD system, a CAE system, a CAM system, a PDM system and/or a PLM system. In those different systems, modeled objects are defined by corresponding data. One may accordingly speak of CAD object, PLM object, PDM object, CAE object, CAM object, CAD data, PLM data, PDM data, CAM data, CAE data. However, these systems are not exclusive one of the other, as a modeled object may be defined by data corresponding to any combination of these systems. A system may thus well be both a CAD and PLM system.

The data processed by the method is now discussed. The data inputted by to method is any data that allows the providing S10 of the signal. The method may be implemented in any one or any combination of the applications discussed in the following, and/or the predetermined space and/or the physical attribute may be any one or any combination of the ones discussed in the following, and/or the physical attribute may the one of a real object, in which case the real object may be any, for example any one or any combination of the ones discussed in the following.

The method is for compressing original data that represent values of a same physical attribute in a predetermined space, noted S throughout the following. The original data can be inputted to the method under any format, possibly already under the format of the signal provided at S10 (which means that the signal provided at S10 is the original data). The method may then provide at S10 the format of interest of the signal to be compressed, that is, including the mapping, in any way. The signal S10 represents the original data. The signal can be built from the pre-provided raw data, in any way, or retrieved as such. The method may process the signal provided at S10 solely.

The physical attribute is any function that conveys information about the behavior of a physical phenomenon that occurs in S. The physical attribute may thus be any space-continuous function (relative to S) that represents a physical phenomenon. The function takes values at least at locations of S, each value being representative of the physical phenomenon at said locations. The function may take values at other locations not considered by the method and that may thus be merely discarded.

The physical attribute may be related to any one or combination of color or photometry data, amount of substance data, shape data, speed data, electromagnetic data, temperature or heat data, mass data, force data, radioactivity data, material quality data, energy data, audio or radio data, chemical data, and/or biological data.

S is any domain that includes locations for which values of the physical attribute are represented. The term "space" is defined in a broad way by the mathematical definition, as in "vector space" for example. The term "location" designates any positioning in S, e.g. including but not necessarily limited to geometrical positioning. In case the physical phenomenon is time-dependent and space S does not include a time dimension, e.g. and it is limited to geometrical positioning, the values may correspond to a same time or a same window of time (e.g. inferior to ten seconds), which means that the values may represent the physical attribute at such same time or window of time, thereby representing a static picture/caption of the physical phenomenon. As can be understood, S may be two-dimensional (for example in case the signal is a 2D image) or three-dimensional (for example in case of 3D representations). But S may also include a time dimension or any other dimension(s).

The physical attribute may be a physical attribute of a real object, for example distinct from the positions of S occupied by material constituting the real object. The real object may comprise any physical entity that has a shape, for example a solid, a fluid and/or any object representable by a set of particles (e.g. a gas). The term "shape" designates any physical structure/geometry of at least a portion of the real object in the real world. In such a case, the hierarchical subdivision may correspond to a hierarchical subdivision representation of the shape of the real object. The hierarchical subdivision representation may for example have leaf cells marked with information indicative of the presence thereat of the real object.

A physical attribute of a real object may thus be a piece of information representative of any set of one or more physical characteristic(s) or feature(s) thereof, e.g. distinct from its mere shape. The physical attribute may be any one or combination of color (e.g. which means each value is representative of the color of the real object at the associated position), normal vector (e.g. which means that each value is representative of the surface normal of the real object at the associated position), a texturing (e.g. the values of the signal being texturing coordinates, e.g. generated by texture atlas creation algorithms, also referred to as UB texturing, such as well-known ABF++ algorithm), and/or speed (e.g. particle speed, e.g. in a fluid simulation in case the object comprises a fluid).

In examples, the method may be applied in a CAD context, for example in an industrial metrology process or an inspection process. The real object may be a manufacturing product, such as a mechanical part of an assembly of mechanical parts. The method may be applied in a medical imaging context. In such a case, the real object may be a biological system, such as an organ or any other biological system, e.g. any biological tissue (e.g. acquired with any medical data acquisition system). The method may be applied in a terrain or urban environment modification. In such a case, the real objet may be a part of a city, e.g. a scene including one or more building(s) or portion(s) thereof. The method may be applied in a 3D reconstruction or virtualization context. In such a case, the real object may be a 3D reconstruction of a real life object. The method may be applied in a fluid simulation context (e.g. SPH). In such a case, the real object may be the fluid and the set of positions may each represent a fluid particle thereof (e.g. in this case, the method may be applied for several frames simulating sequence of the behavior of the fluid).

The real object may be a product to be manufactured in the real world subsequent to the completion of its virtual design with for instance a CAD software solution or CAD system, such as a (e.g. mechanical) part or assembly of parts (or equivalently an assembly of parts, as the assembly of parts may be seen as a part itself from the point of view of the method, or the method may be applied independently to each part of the assembly) or more generally any rigid body assembly (e.g. a mobile mechanism). A CAD software solution allows the design of products in various and unlimited industrial fields, including: aerospace, architecture, construction, consumer goods, high-tech devices, industrial equipment, transportation, marine, and/or offshore oil/gas production or transportation. The 3D modeled object designed by the method may thus represent an industrial product which may be any mechanical part, such as a part of a terrestrial vehicle (including e.g. car and light truck equipment, racing cars, motorcycles, truck and motor equipment, trucks and buses, trains), a part of an aerial vehicle (including e.g. airframe equipment, aerospace equipment, propulsion equipment, defense products, airline equipment, space equipment), a part of a naval vehicle including e.g. navy equipment, commercial ships, offshore equipment, yachts and workboats, marine equipment), a general mechanical part (including e.g. industrial manufacturing machinery, heavy mobile machinery or equipment, installed equipment, industrial equipment product, fabricated metal product, tire manufacturing product), an electro-mechanical or electronic part (including e.g. consumer electronics, security and/or control and/or instrumentation products, computing and communication equipment, semiconductors, medical devices and equipment), a consumer good (including e.g. furniture, home and garden products, leisure goods, fashion products, hard goods retailers' products, soft goods retailers' products) a packaging (including e.g. food and beverage and tobacco, beauty and personal care, household product packaging).

Space S may be any predetermined space where the real object is defined. It may be a scene, for example a 2D or a 3D scene, where the real object is represented by locations, for example a scene where the real object has been designed, loaded, or yet a reconstructed scene when the real object is used in a 3D reconstruction process. Space S may alternatively be a box bounding the real object in such a scene, for example—e.g. a smallest—square or cube geometrically including the object.

The method may be applied in a number of contexts where a set of values in S is provided and relatively irregular and/or sparse (which may be ensured by the hierarchical subdivision having at least one empty leaf cell, i.e. a leaf cell not mapped from onto a coefficient or mapped from onto a null, e.g. all the empty cells corresponding to at least 10% or 50% of the size of S), and/or the physical attribute has a non-zero space correlation (e.g. a space correlation of a value strictly higher than 0, e.g. a relatively high value), depending on what the physical attribute is. In such contexts, the method achieves a particularly high compression ratio. For example, the method may be applied in particle-based applications (e.g. point cloud rendering, fluid simulation with SPH—such as smoothed-particle hydrodynamics—, or 3D model compression).

In examples, at least part of the original data may be provided by data acquired with one or more 3D scanners (i.e. 3D data acquisition devices). Alternatively or additionally, at least part of the original data may be provided by a 3D reconstruction sensing device, including an RGB camera and/or a depth sensor, such as an RGBD camera. Alternatively or additionally, at least part of the original data may be user-designed/defined. The values in the original data may stem from caption(s), measurement(s), simulation(s) and/or design(s) of the physical phenomenon. The original data and thus the signal then provided at S10 thereby present a certain level of space-correlation relative to S.

As explained, the original data may take any format. Notably, the original data may comprise a set of locations of S each provided with a respective value of the physical attribute. The set of locations may be provided as a set of positions, for example a 2D or 3D point cloud or a 2D or 3D mesh. The positions may represent the shape or presence of material of a real object, such as a solid, a fluid, a gas or any tangible object. Alternatively or additionally, the original data may comprise positions where the physical attribute takes values that are not representative of material of the real object. Yet, the original data may amount to the signal of S10. In any case, the original data represents a physical attribute that takes values in S.

Be it provided S10 as such or built from other original data, the signal compressed by the method is of a specific structure. Specifically, it includes a mapping from elements of a hierarchical subdivision of S each onto a respective coefficient. The mapping can be determined in any way. It may be determined based on the original data. The hierarchical subdivision of S may be present in the original data, or built during a method for compressing shape information, independently from the method of FIG. 1. In any case, elements of the hierarchical subdivision of S, that is, cells, point to (or are "associated to", "related to", "linked to") coefficients. The coefficients each represent a value of the physical attribute at the cell it is pointed from, in line with the original data.

In case the original data is provided as a set of locations of S, such as a 2D or 3D point cloud or as 2D or 3D a mesh, the hierarchical subdivision may be built in any way, for example via a space tree-partitioning, such as the BSP, K-d trees, octrees (e.g. for a 3D shape) or quadtrees (e.g. for a 2D shape), mentioned with respect to the prior art. Such hierarchical subdivision can be performed independently and/or prior to the method of FIG. 1, for example to represent the shape of a real object in a compressed way, as mentioned with respect to the prior art. The physical attribute values provided for the set of locations may be assigned to the respective leaf cells of the hierarchical subdivision that represent the respective locations. The assignment can be performed in any way, e.g. by averaging in case there are several original locations per leaf cell. It is here understood that the hierarchical subdivision may comprise empty leaf cells, that is, leaf cells not necessarily associated to a physical attribute value. In any case, the mapping in the signal provided at S10 constitutes a compression of the original attribute value-per-position (e.g. point cloud) original raw data, from the point of view of localizing data. The method of FIG. 1 goes further by yet compressing the signal provided at S10.

A hierarchical subdivision of a given space s is, by definition, data representative of a hierarchical (i.e. recursive) subdivision of s into cells (i.e. portions of s). Definitions known per Se are provided below. But it is here noted that examples of a hierarchical subdivision of a given space s representing the shape of a real object include space tree-partitioning, such as the BSP, K-d trees, octrees (e.g. for a 3D shape) or quadtrees (e.g. for a 2D shape), mentioned with respect to the prior art. The definitions provided below thus apply to such specific kinds of hierarchical subdivisions (well-known from the prior art), which can thereby be implemented by the method.

A "cell" is any portion of space s. Space s may thus be a cell itself. Cells may be limited to regular and/or convex sub-parts of s. In examples, all cells may present the same shape as s. For example, if s is a cube (resp. a square), cells may correspondingly be limited to cubes (resp. squares). In examples, cells of a same level of the recursion may present the same geometry (shape and dimensions), thereby differing only in their position. In examples, cells of all the levels of the recursion may present the same shape, differing only in their dimensions and position. The dimensions may be fully determined by the level in the recursion, possibly together with the dimensions of space s.

By data representative of a "recursive subdivision", it is meant a data structure that represents a hierarchical partitioning of space s, for example in the form of a tree structure (of maximum tree depth n), for example a single tree having a unique root node (the root node being for example representative of s, s being thereby the starting cell of the subdivision) or a set of several trees each having a respective root node. The expression "recursive subdivision" designates both the operations that result in the hierarchical partitioning (which may be but is not necessarily executed within the method of FIG. 1, prior to S20) and the result itself—i.e. the hierarchical partitioning itself. Cells of the recursive subdivision (called "parent" cells) may be each subdivided into several respective cells (called "children" cells). The children cells of a given (same) parent cell form a space partitioning of the parent cell, according to the well-known mathematical definition of a set partitioning applied to the set of positions of a space.

A hierarchical subdivision of a space s may be a maximum depth n hierarchical k-subdivision of s. A maximum depth n hierarchical k-subdivision of a given space s, also referred to by the expression "k-partitioning of space s with depth n", can generally be noted k_tree″(s) in the following, and it is, by definition, data representative of a recursive subdivision of s into cells (i.e. portions of s), a path in the recursion having a length inferior or equal to n (i.e. at most n subdivision operations in a single recursion, corresponding to the definition of "depth" for tree data structures). Each subdivision of a given cell may lead to exactly k children cells (i.e. cells having the given cell as their common parent cell), where k is a strictly positive integer which may be predetermined. k may be constant over the different subdivisions. As well-known, in the case of octrees (resp. quadtrees), k equals to 8 (resp. 4), and children cells of a given cell are called "octants" (resp. "quadrant").

The recursive subdivision may be performed in a predetermined way, i.e. according to a predetermined subdivision scheme. In an example, the recursive subdivision may execute the same predetermined subdivision operation at each iteration of the recursion. This way, at each cell subdivision, the children cells can be geometrically located by merely determining where they are logically positioned in the data structure forming the k_tree″(s). A k_tree″(s) may thus simply comprise a link to space s (e.g. a pointer or a relation in a relational database), and a (e.g. minimalist) tree data structure that represents logically the whole recursive subdivision, where each node represents a cell in the linked space (i.e. space s). Thanks to the subdivision having been performed according to a predetermined way and the k_tree″(s) having thereby a corresponding and pre-known datatype (i.e. indicative of said predetermined way), each node of the tree structure represents a well-located cell in space s, as such and with no specific geometrical data associated to it. This is widely known, notably from octrees or quadtrees.

For example, in an octree (resp. quadtree), with respect to a predetermined orientation (x,y,z) (resp. (x,y)), each subdivided cell may be a cube (resp. square) and lead to eight (resp. four) children cells each having a length being the half of the length of the subdivided cell (i.e. each dimension is cut in half). The location of a respective cell may thus be fully determined by assigning to each piece of data (e.g. node) in the k_tree″(s) representing a cell a relative positioning with respect to its parent cell and by linking the root (e.g. node) to space s. The relative positioning may be determined in a minimalistic way by the data organization of the tree. The relative positioning may amount to one of two possible values with respect to (x,y,z) (resp. (x,y)). These possible values can for example be noted "left" and "right" with respect to x, "front" and "back" with respect to y, and "top" and "bottom" with respect to z in the case of an octree. These are just notation conventions, as any binary parameter can be contemplated. Notations of the type $\{0,1\}^{p\sqrt{k}}$ such as $\{0,1\}^3$ are retained in the following. The location and geometry of a cell in such a k_tree″(s) is thereby fully determined by the knowledge of s and of the logical position of the piece of data (e.g. node) representing the cell in the k_tree″(s).

A k_tree″(s) may thus be a tree data structure that points to space s and having nodes that represent cells of s, the root node representing space s itself. A k_tree″(s) has directed arcs, each from a respective start node to an end node. The arc captures the fact that the end node represents a sub-cell of the cell represented by the start node. The arcs having a same start node may be organized such that relative positioning of each cell represented by an end node thereof is predetermined. In such a case, the maximum depth of a k_tree″(s) is the number of arcs of the largest branch of the k_tree″(s), and it is equal to n. n may be predetermined to the recursive subdivision. Alternatively, notably if the recursive subdivision has been performed on a data structure that represents the shape of the real object as a finite set of geometries, such as 3D positions or 3D mesh tiles or vertices of a mesh, n may be determined by a—e.g. fineness or resolution—criterion implemented by the recursive subdivision scheme. For example, n may be determined as the smallest integer such that each cell contains at most one single geometry (e.g. one single position or vertex). This is merely an example.

Now, in a k_tree″(s) that represents a shape and/or physical attribute values, each cell is empty or non-empty, meaning that each cell of the recursive subdivision represented by the k_tree″(s) whether contains none of the shape and/or physical attribute (i.e. empty cell) or at least a part of the shape and/or physical attribute (non-empty cell). An empty cell may thus be a cell that contains no material of the real object, while a non-empty cell is a cell that does contain material of the real object. The k_tree″(s) may thus include data that captures such information, and this data can be of any kind, e.g. including pointers each from a cell to a value/marker (for example a binary value) that indicates whether the cell (e.g. represented by a node) represents an empty cell or a non-empty cell. Each non-empty cell of depth different from n may be subdivided into k cells. In other words, as long as material and/or physical attribute information is present in a cell and the maximum depth allowed for the subdivision is not reached, the cell is subdivided so as to refine the information conveyed by the cell. This emptiness and non-emptiness information can be provided in any way, and the geometry of the shape of the real object may thereby be represented by the location of the non-empty cells, which is fully determined by the logical positioning mentioned earlier.

As known from the prior art, a k_tree$^n$(s) thus constitutes a compressed version of the shape of the real object, by designating cells in space s that comprise material (at a resolution that corresponds to n subdivisions of space s), in a logical way rather than a geometrical way based on exact locations. If the recursive subdivision has been performed based on exact geometry, such exact geometry may be discarded. Such a case can correspond to a lossy compression of data representing the shape of the real object in the form of exact geometry. The method of FIG. 1 may follow such a first lossy compression. But the exact geometry may alternatively be kept. Indeed, the method of FIG. 1 applies to the signal representing the physical attribute, not to data representing the shape of the real object per se, which may thus undergo any other process.

The recursive subdivision may be configured such that each empty cell is necessarily a leaf cell. This means that an empty cell cannot be subdivided. In other words, when a cell with no material is found during the recursion, the process does not subdivide it anymore. This increases the compression ratio, as known from the prior art.

The signal compressed by the method of FIG. 1 may relate to a k_tree$^n$(s) representation of the shape of a real object but it is not the k_tree$^n$(s) as such. In specific, the signal initially represents the above-mentioned physical attribute of the real object via a distribution of coefficients on non-empty leaf cells. A coefficient is any piece of data representative of the value taken by the physical attribute at the non-empty leaf cell, e.g. a double and/or floating point and/or integer or a vector/set/list thereof. Null may also be distributed on non-empty leaf cells of K_tree$^n$(S) and be authorized as coefficients, e.g. and be representative of a zero value. The zero value can also be represented by no coefficient at all, in which case it is considered that the physical attribute is equal to zero in all non-empty leaf cells for which no information or at least no contrary information is provided (e.g. such as a coefficient different from 0). Alternatively, it can be required that the zero value be represented by positively present information only. These are implementation details that depend on the conventions retained.

Coefficients associated to empty leaf cells or to non-leaf cells, if any, may be not considered and may thus be discarded by the method (e.g. deleted and/or at least not processed or involved in the computations). In case a coefficient is not a scalar (i.e. unidimensional) but a vector/set/list (i.e. multidimensional), the method of FIG. 1 can be applied once seeing the vector/set/list as a whole or several times, each time by projecting the vector/set/list on a set having a reduced dimension, e.g. coordinate-by-coordinate (e.g. seeing each coordinate as a distinct physical attribute).

The determining S20 is now discussed.

Determining a discrete wavelet transform of a given initial signal generally means, by definition and as known per se from the field of signal processing, involving a predetermined basis of wavelet convolution filters. The predetermined basis is merely a predetermined set of wavelet functions (each function respecting wavelet properties). The filters may each be passed over (i.e. applied iteratively) to a given initial signal and each lead to a respective subband. The subbands thereby obtained correspond to coordinates of the given initial signal with respect to the basis, and together they form a compressed way of representing the signal (the compression being achieved by the later encoding). One of the subbands, called the "low-pass subband", participates less in the overall compression than the other subbands. For this reason, the process can be reiterated on this low-pass subband (with the same basis), and so on. Therefore, by definition, determining a discrete wavelet transform of a given initial signal means that, with the predetermined basis of wavelet convolution filters, the method of FIG. 1 iterates (via recursion) a determination of respective subbands (a same single iteration leading to several subbands: one respective subband per respective filter), including at each iteration a low-pass subband, starting from the given initial signal. In a discrete wavelet transform, applying a respective wavelet convolution filter to a subband is called "passing the subband through" the respective wavelet convolution filter. The filter is thus "slid" on all the initial coefficients of the subband being passed through the filter. This is all known per se.

Basically, the method comprises recursively passing each of the wavelet filters over the coefficients provided in the signal at the first recursion, and then at subsequent recursions over the wavelet coefficients of the lowpass subband obtained at the previous recursion. The passing follows the structure of the hierarchical subdivision. At each recursion, each wavelet coefficient is assigned to a same "next" hierarchical subdivision, following the structure of the "current" hierarchical subdivision, starting from the initial hierarchical subdivision. Thus, the passing follows the structure of the hierarchical subdivision, not only at each recursion but also throughout the whole recursive process of the transform. This ensures preservation of space correlation and thus a fine result. Also, this participates to speed of compression and/or decompression time.

Given the specific format of the input signal provided at S10, the way the discrete wavelet transform is determined at S20 is now detailed with the example of an octree as the hierarchical subdivision. The method comprises providing at S10 a signal noted $c^{N,000}$. $c^{N,000}$ is defined with respect to an octree data structure in this example. The example may however be applied to other hierarchical subdivision types.

$c^{N,000}$ includes (data representative of) a mapping noted $c^{N,000}(\bullet)$ from leaf cells of the octree, noted octree$^N$(S), with respect that the octree subdivides space S with a maximum depth equal to integer N. As explained earlier, not all leaf cells of octree$^N$(S) are mapped this way onto the image. For example, leaf cells of depth different from N may be necessarily empty. Some leaf cells of depth N may also be empty. Also, octree$^N$(S) may belong to a larger octree whose leaf cells are different from those of octree$^N$(S). This is merely a point of view, the method considering an octree where the physical attribute is defined at the leaf level.

In line with the examples provided above and retained in the following, the leaf cells of octree$^N$(S) that are mapped onto a respective coefficient may be noted via their path in the octree: $\alpha_N^1 \alpha_N^2 \ldots \alpha_N^N \in C(L_N(\text{octree}^N(S)))$, where each $\alpha_N^n$ (for each $n \in \{1, \ldots, N\}$) is a triplet taking values in $I \in \{0,1\}^3$ that indicates the branching direction taken in the octree from the previous node, starting from the root node. $L_N$ is a notation that represents all leaf cells of depth N in octree$^N$(S). C is a notation that represents for a hierarchical subdivision all cells mapped onto a coefficient in the signal. The number of such cells in the initial signal can be referred to as the cardinal of C(octree$^N$(S)), and it can be noted $|c^{N,000}(\bullet)|$. In case the only cells from which the coefficients are mapped onto are leaf cells of depth N only, $|c_{N,000}(\bullet)| = |C(\text{octree}^N(S))| = C(L_N(\text{octree}^N(S)))$.

In the following, the considered signal amounts to a mapping $c^{N,000}(\bullet)$ where $|c^{N,000}(\bullet)|=|C(L_N(\text{octree}^N(S))|$, meaning that only leaf cells of depth N are mapped onto a signal. $C(L_N(\text{octree}^N(S)))$ is thus the set of all such $\alpha_N^1 \alpha_N^2 \ldots \alpha_N^N$, that is all leaf cells of the hierarchical subdivision mapped onto a coefficient. Also, octree$^N(S)$ may comprise leaf cells not mapped onto a coefficient, including of depth N and/or of depth different from N. Such a signal can be built upon the octree obtained from compressing a set of positions provided with an attribute value, as mentioned earlier.

Each leaf cell $\alpha_N^1 \alpha_N^2 \ldots \alpha_N^N$ thus mapped onto a respective coefficient sees such coefficient noted $c^{N,000}(\alpha_N^1 \alpha_N^2 \ldots \alpha_N^N)$. Such coefficient is representative of a value of the physical attribute at the respective leaf cell. This whole mapping thus represents how the physical attribute operates on space S.

Now, as mentioned earlier, the method of FIG. 1 comprises determining S20 a discrete wavelet transform of this signal with any predetermined basis of wavelet convolution filters. The filters can be at the number of 8 in an example and thus noted $f_I(d,s)$, $I \in \{0,1\}^3$, meaning that each recursion of the discrete wavelet transform produces eight subbands. The example can also work with other numbers of filters in the basis. The set where the indexing of the filters takes values can also be noted $I \in \{L,H\}^3$, "L" referring to low-pass and "H" referring to high-pass, the exponent referring to a natural basis for the 3D case of the octree example (the indexing of the basis would be $I \in \{0,1\}^2$ for a quadtree). d is a wavelet function and s is a scaling function.

As known, the determining S20 amounts to recursively determining subbands (eight in the example). Each recursion (or iteration/repetition) can be indexed D. D decreasing in the example notations retained here. In examples focused on in the following, and due to the dimensioning of the different objects at use, D specifically decreases one-by-one from N−1, and this can stop any time but also go all the way to 0, such that $D \in \{N-1, N-2, \ldots, 0\}$ and takes the successively decreasing integer values of this set of integers. Each subband determined at a given recursion D can thus be noted $c^{D,I}$, with $I \in \{0,1\}^3$ or $\{L,H\}^3$. These eight subbands include a low-pass subband, noted $c^{D,000}$ (or equivalently $c^{D,LLL}$). Each such subband is determined, as known, by passing each wavelet convolution filter $f_I$ over the low-pass subband of the previous recursion (recursion D+1), noted $c^{D+1,000}$. At the start of the recursion, there is no low-pass subband yet so that it is considered to be the initial signal, i.e. $c^{N,000}$.

As explained earlier, in traditional discrete wavelet transforms, at each recursion the low-pass subband is passed through a series of filters, for example independently, or equivalently a series of filters is passed over the low-pass subband (i.e. the filter is slid or shifted over locations where the coefficients of the low-pass subband are and involves said coefficient values in a computation provided by the filter definitions, which is known per se). In the present case, the low-pass subband has the format of an octree with coefficients in leaf cells thereof (by way of the mapping). Thus passing a given filter over such an octree amounts to passing over leaf cell regions of the low-pass subband where there are coefficients (i.e. with coefficients mapped onto), including but not consisting of passing all such coefficients through the given filter.

The format of the initial signal is maintained, such that the operation can be repeated throughout the recursion, from N−1 to 0. Indeed the subbands $c^{D,I}$ determined at recursion D and notably the low-pass subband $c^{D,000}$ each include a respective mapping $c^{D,I}(\bullet)$ from leaf cells of an octree to coefficients (determined by the wavelet filters, and thus called wavelet coefficients), just like the initial signal. Where the octree of the initial signal was of depth N, such octree considered at iteration D is of depth D. This octree is the same for all the subbands determined at recursion D (the mapping defined over it being however possibly different).

Different instances may be created, but the octree is architecturally the same, such that it can be noted octree$^D(S)$ (no subband index I). Thus, the leaf cells of such octree can also be noted without such indexing, as paths of depth D: $\alpha_D^1 \alpha_D^2 \ldots \alpha_D^N \in C(L_D(\text{octree}^D(S)))$, with each $\alpha_D^{n, n \in \{1, \ldots, D\}}$ of such paths to cells varying in $\{0,1\}^3$. octree$^{D+1}(S)$ is a subdivision of octree$^D(S)$, meaning that it corresponds to subdividing one or more cells of octree$^D(S)$. In the example, octree$^D(S)$ is even a subtree of octree$^{D+1}(S)$. Equivalently, octree$^{D+1}(S)$ is a subdivision of octree$^D(S)$, that means that it corresponds to an additional subdivision step in the octree recursive subdivision construction process performed on S. This implies that octree$^0(S)$ is S itself. As will be shown later in example with reference to figures, the method of FIG. 1 thus rewinds octree$^N(S)$.

Basically, each given leaf cell $\alpha_D^{1*} \alpha_D^{2*} \ldots \alpha_D^{D*}$ of $C(L_D(\text{octree}^D(S)))$ is mapped onto a respective coefficient noted $c^{D,I}(\alpha_D^{1*} \alpha_D^{2*} \ldots \alpha_D^{D*})$. $c^{D,I}(\alpha_D^{1*} \alpha_D^{2*} \ldots \alpha_D^{D*})$ is determined, during the passing of the wavelet convolution filter $f_I$ over the low-pass subband $c^{D+1,000}$ of previous recursion D+1, by applying $f_I$ not to any coefficients of $c^{D+1,000}$, but to those coefficients of $c^{D+1,000}$ mapped onto from leaf cells of octree$^{D+1}(S)$ that subdivide $\alpha_D^1 \alpha_D^2 \ldots \alpha_D^D$. In other words, when passing a low-pass subband over a filter, the coefficients of a block of leaf cells (i.e. leaf cells having a same parent cell) produce a coefficient mapped onto the parent cell (which is also a leaf cell of the octree associated to the next low-pass subband). All such leaf cells may be involved in the example, due to the dimensions retained (because of the size of the compact support of the filters being the same as the octree divider in the example). The coefficients can thereby be noted $c^{D+1,000}(\alpha_D^{1*} \alpha_D^{2*} \ldots \alpha_D^{D*} \alpha_{D+1}^{D+1})$ and the $\alpha_D^{1*} \alpha_D^{2*} \ldots \alpha_D^{D*} \alpha_{D+1}^{D+1}$ (with $\alpha_{D+1}^{D+1}$ varying in $\{0,1\}^3$) belong to $C(L_{D+1}(\text{octree}^{D+1}(S)))$.

The wavelet convolution filters may have a compact support. Thus the filters are designed to take as inputs coefficients mapped onto by adjacent cells. This allows preservation of space correlation and thus leads to a good result.

The size of the compact support may be smaller or equal to the minimal value of the divider of the hierarchical subdivision. The divider of the hierarchical subdivision is the number of cells that stem from the subdivision of one cell during the hierarchical subdivision process (e.g. performed prior to the method). It may be the number of children cell each parent cell has in the hierarchical subdivision. This may be a varying or a constant value. In the case of a varying value, the minimal value is considered. In the case of constant value, it is considered that the minimal value equals said constant value. In the case of an octree, the divider is 8 (i.e. $2^3$), because each cell is whether a leaf cell or has eight children. The size of the compact support smaller or equal to the minimal value of the divider of the hierarchical subdivision allows preservation of space correlation, even in case of relatively very sparse hierarchical subdivisions.

In case the divider of the hierarchical subdivision has a constant value, the size of the compact support may be equal to the constant value of the divider of the hierarchical subdivision. In the example of an octree mentioned earlier, the compact support may be $\{0,1\}^3$, and thus be of size 8. Thus, the filters each apply to the leaf cell of maximum depth of the hierarchical subdivision (at each current recursion of the discrete wavelet transform), "block of sister cells-by-block of sister cells". Such configuration ensures the efficiency of the compression.

Passing the filters over the cells of the current recursion's hierarchical subdivision may be performed in any way that respects the ordering defined by the hierarchical subdivision. During the passing, for at least at one given recursion D, notably if the filters are constrained to apply on a compact support, the passing may encounter at least one leaf cell mapped onto no coefficient. This leaf cell can be noted $\alpha_{D+1}^{1'} \alpha_{D+1}^{2'} \ldots \alpha_{D+1}^{D+1'}$, and it does not belong to $C(L_{D+1}(\text{octree}^{D+1}(S)))$. The cell being mapped onto no coefficient, the filters may handle the case in any way.

In an example, the determining S20 includes in such a situation assigning a respective value, noted $c^{D+1,000}(\alpha_{D+1}^{1'} \alpha_{D+1}^{2'} \ldots \alpha_{D+1}^{D+1'})$ to such encountered cell. The (same) assigned value is then inputted to each of the wavelet convolution filters. In other words, the method fills the compact support of the filters with "artificially" assigned values such that the filters can apply straightforwardly. This allows implementing any filters defined with respect to compact support of known space, and notably any predetermined 2D image filter basis in the case of quadtrees or any any predetermined 3D image filter basis in the case of octrees.

The argument of the filters is thus each time the filters are applied on a block of cells the above-mentioned coefficients $c^{D+1,000}(\alpha_{D+1^*} \alpha_{D+1}^{2^*} \ldots \alpha_D^{D^*} \alpha_{D+1}^{D+1})$, with $\alpha_D^{1^*} \alpha_D^{2^*} \ldots \alpha_D^{D^*}$ designating the path to the parent cell of the block and $\alpha_{D+1}^{D+1}$ varying in $\{0,1\}^3$ among all cells mapped onto a coefficient, complemented with assigned values $c^{D+1,000}(\alpha_{D+1}^{1'} \alpha_{D+1}^{2'} \ldots \alpha_{D+1}^{D+1'})$ when absent coefficients are encountered (i.e. "empty" cells) should it be the case.

At the time of the decompression, the artificially assigned values may be filtered out by being recognized by the decoder. For example, the method may comprise keeping among the data information about which leaf cells of the initial hierarchical subdivision are mapped onto a coefficient. For example, the method of FIG. 1 may comprise a step of marking such cells. The markers may be present in the compressed signal. Coefficients obtained when decompressing the signal and mapped onto other leaf cells may be discarded.

The assigned value may be determined in any way. For example, it may be determined with respect to a criterion related to forcing one or more zeros in the subbands determined at the given recursion. In other words, the method assigns values not randomly, but in expectation of the filters involving them, such that zeros are then obtained. The assigned values are thus arguments of the filters that lead to zero results (when applying the filters). The assigned values may be determined based on the filters and on the present coefficients, in an iterative way (e.g. empty cell by empty cell). Examples of doing so are provided later. Zeros can then be encoded very efficiently, and thereby participate to a high compression rate. Wavelet coefficients equal to zero thus obtained may be referred to as "forced zeros".

The criterion may be that the number of coefficients of all the subbands determined at the given recursion not forced to zero is equal to the number of coefficients of the low-pass subband of the previous recursion not forced to zero. The criterion may be noted $|c^{N,000}(\bullet)| = \Sigma_{I \in \{0,1\}^3, D \in \{N-1, N-2, \ldots, 0\}} |c^{D,I}(\bullet)|$. This way, the number of coefficients provided in the initial signal is maintained throughout the recursion, and the method achieves a particularly high compression ratio. For example, at each recursion the coefficients may be seen as dispatched to all the subbands (e.g. substantially equitably), modulo the transform operated by applying the filters.

Figure 3:
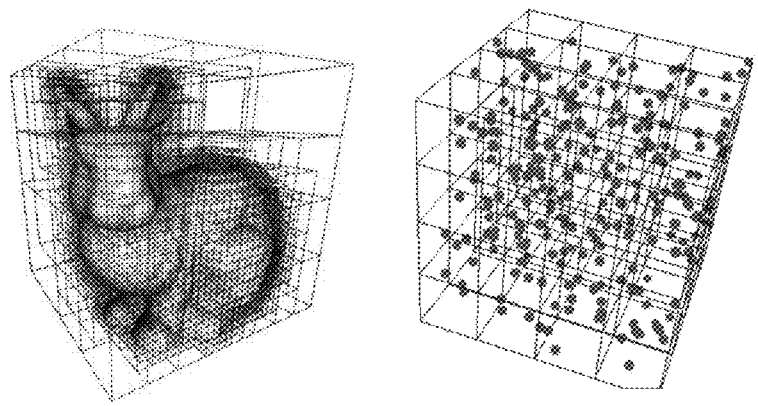

An overview example of the method of FIG. 1 in line with the above is now discussed. FIG. 3 illustrates how original data provided as a mesh (left drawing) or a point cloud (right drawing) may be partitioned with an octree in order to provide S10 the signal including the mapping from leaf cells of the octree to coefficients.

Figure 4:
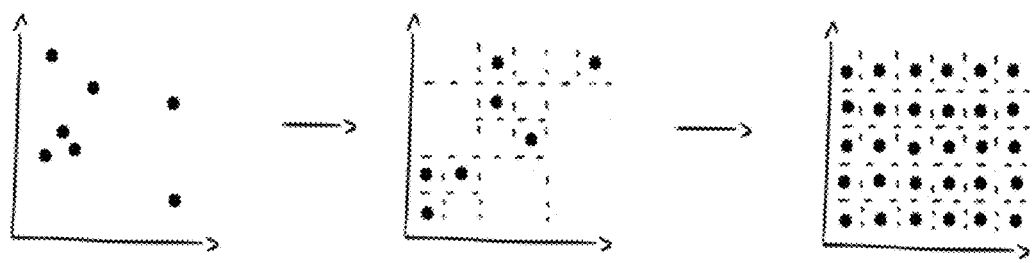

The overview example of the method with an octree may focus on the compression of vertex attributes. The method of the example assumes that the space has already been partitioned in an octree, which is compatible with most of the prior art approaches listed earlier, since most use an octree to compress vertex positions. Thus, instead of starting from an unstructured set of positions, the method of the example starts from an octree (possibly obtained from the unstructured set of positions). FIG. 4 illustrates schematically such an octree-partitioning process starting from a point cloud, which may be executed before the method.

The example of the method can be seen as related to wavelet compression schemes for images. The example of the method adapts this idea to the octree structure. The example of the method builds on the fact that attributes of vertices in adjacent cells are correlated (ex: particles located the same area are likely to have close color values, if color is the attribute we want to compress). Wavelet compression is well-known for completely regular structure (e.g. image or video) where the attribute to be compressed (e.g. pixel color) is defined everywhere. The example of the method adapts such a scheme to an octree where a leaf might contain a particle (and then a defined value for the attribute to be compressed) or be empty.

The method may thus consist in a computer-implemented method to compress a set of particles in a 2D or 3D space on a storage means. The method may in an example be applied to compress a set of particles (vertices) in 2D or 3D, where each particle has a position in space and at least one attribute (usually a color and a normal vector) that one wants to compress. The method may assume that the space has already been partitioned in an octree (or quadtree in 2D), where each leaf might contain a particle (and then a defined value for the attribute to be compressed) or be empty. The octree structure is convenient since the approaches known in the prior art most often adopt this data structure. The method further assumes that the octree is encoded with any predetermined compression scheme, which can be successfully reconstructed at the decoder (by doing so the decoder recovers the particle position). The method then provides for compressing the attribute values on the set of particles, such as colors, normal vectors and/or speed. The compression scheme to encode/decode the octree may be any such scheme. A convenient scheme is the geometry coder described in earlier-mentioned paper "*Geometry-guided progressive lossless 3D mesh coding with octree decomposition*", by Peng et al. This scheme builds an octree with the desired properties, but any method based on octree from earlier-listed papers can alternatively be used. The octree structure may be encoded and/or decoded prior to (and separately from) the attribute.

In order to better understand the method of examples, a summary on how wavelet compression schemes work for images is provided. This framework may be implemented by the examples of the method.

Wavelet compression scheme for image consist in the following steps. First, wavelet transformation is performed:

a discrete wavelet transformation is applied to the spatial structure. Then, quantization is performed: the resulting wavelet coefficients are quantified (as well-known). Then, encoding is performed: quantified wavelet coefficients are encoded. In some cases, additional steps (e.g. block division, color space transformation, and/or data alignment with PCA) might also be applied. The method may also follow such architecture, and notably include a quantization step after (e.g. interlaced with) the determining S20. The decoding scheme may then be the exact symmetrical opposite, with each reverse step being applied in the reverse order. More detailed explanations on these steps is provided below.

Encoding is where the data size is truly reduced: short symbols are output according to the input symbols, but in such a way that the operation stays reversible. Encoders that have been used in wavelet compression schemes include generic encoders like run-length encoder, entropy encoders (e.g. Huffman coder, Arithmetic coder) or dictionary encoder (e.g. Lempel-Ziv coder), and dedicated encoders (e.g. Zerotrees coders, SPIHT, EBCOT). Any combination of these coders can also be implemented (e.g. run-length encoder+Huffman coder). This stage is most of the time fully sequential; that means it can hardly be parallelized on a GPU, and it prevents data random access as one cannot decode a symbol in the middle of the encoded data without having to decode all previous symbols. The efficiency of the encoder (compression ratio) is affected by the diversity of the symbols in the input data and by the distribution of these symbols. The output is smaller if the input only uses a small set of symbols. The output is smaller when far from an equiprobable distribution: if the input contains a lot of zeroes and only few non-zero symbols, the compression ratio is high.

Quantization is the process of mapping a large set of input values to a smaller set, such as rounding values to some unit of precision. A device or algorithmic function that performs quantization is called a quantizer. The round-off error introduced by quantization is referred to as quantization error. Once more, many quantizers have been use in wavelet compression schemes. This stage involves that some data is lost (quantization error) and is then irreversible. Lossless wavelet compression schemes skip this stage. This stage makes the encoding step more efficient since it drastically reduces the diversity of the symbols. It might also affect the symbol distribution (for example, the dead-zone quantizer tries to round most values to zero).

Figure 5:
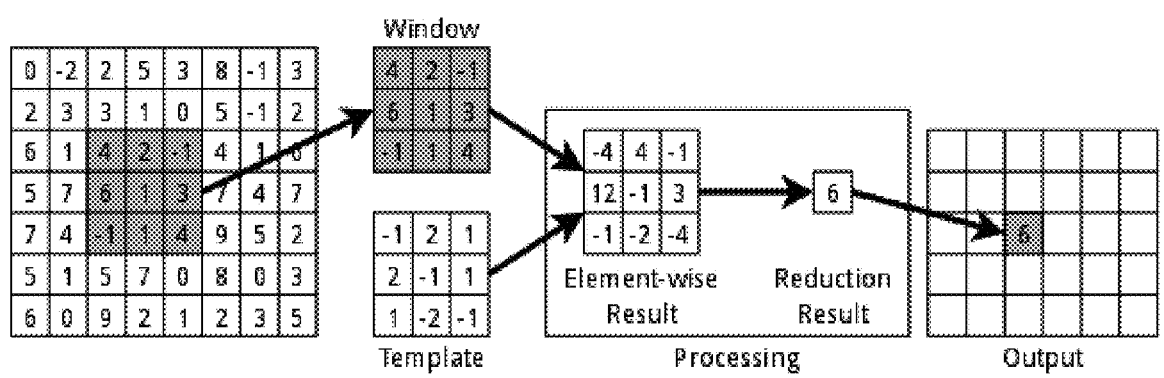

Wavelet transformation compacts the energy of the signal on some coefficients, letting the others coefficients close to zero. It is most of the time an almost reversible transformation. Wavelet transformation is determined mostly by the choice of the wavelets. This choice can be made according to the form of the signal to be compressed: Haar wavelets are well-suited to fast varying signals. LeGall 5/3-wavelet and 9/7-CHF-wavelet are more suited to slow-varying signals. This stage makes the encoding step more efficient by affecting the symbol distribution: wavelet transformed images have a lot of zeroes and only few non-zero coefficients. Wavelet transformation is performed by applying iteratively as a series of convolution filters. An image convolution is performed by what is called the sliding window approach: for each pixel in the image, a local neighborhood of pixels is multiplied by a weighting kernel, and then added up to get the value of the new pixel. FIG. 5 illustrates schematically such an example of convolution performed with the sliding window algorithm. Another approach called lifting filters and detailed in paper "*The Lifting Scheme: A Construction of Second Generation Wavelets*", by Wim Sweldens) is sometimes preferred as it is faster, but it is completely equivalent to the convolution filters approach. This stage is said to exploit the spatial correlation of the signal: it removes the dependency of a pixel to its neighbors, which can be seen as redundant information and data compression is somehow the removal of redundant information.

When the discrete wavelet transformation step is performed on an image N*N, a series of convolution filters is applied iteratively. This decomposes the image into a series of smaller images called subbands. This is illustrated on FIG. 6, which shows a multi-resolution analysis: the N*N resulting wavelet coefficients are sorted in subbands. Each subband contains tile information limited to a given frequency range (including low-pass). One level of wavelet decomposition allows building four subbands from the low-pass subband derived during the previous decomposition steps. Each subband dimension is two times smaller than the dimension of the image/subband it originated from. As can be seen on FIG. 6, subbands 1HL, 1LH, 1HH, 1LL are the result of the wavelet decomposition applied on the complete tile (their dimensions are N/2). Subbands 2HL, 2LH, 2HH, 2LL are the result of the wavelet decomposition applied on subband 1LL (their dimensions are N/4); and so on. The hierarchical subband structure can be referred to as the multi-resolution analysis (as produced coefficients are grouped by frequency range). The total number of wavelet coefficients at the end of the process is the same as the number of input pixels (N*N).

All that has been said above can be extended to 3D images. Instead of four subbands, one level of wavelet decomposition produces eight subbands. This is illustrated on FIG. 7, which shows subbands when the discrete wavelet transform is performed in 3D. However, in order to adapt a discrete wavelet compression scheme to an octree structure, the main difficulty is that, unlike traditional images where one has a completely regular (e.g. grid-like) structure, here the attributes lie on a more complex structure where attribute values are not defined everywhere. Yet, the only step affected by this statement is the wavelet transformation: both convolution filters and lifting filters need to define a local neighborhood for each particle, which is not as clear now. The quantization step does not look at the neighborhood of a pixel. The encoding step might be affected by the order of the coefficients, but to a lower extend compared to the wavelet transformation. Thus, adaptation of the encoding (and optional quantization) to this scenario is straightforward, the main issue being the wavelet transformation (i.e. the determining S20).

An example of adaptation of such a discrete wavelet transformation to a 3D octree is now discussed, in line with examples of the method discussed with reference to FIG. 1.

The example is now discussed in further details, where the new discrete wavelet transform applied to an octree is referred to as sparse wavelet transformation.

First, one can look at what the multi-resolution analysis should be like. Where the usual input should be a 3D regular image of N*N*N pixels (with a defined value in each pixel), the method deals with an octree of maximum depth N where each leaf can hold a well-defined value (if a particle is present in this cell) or not (if no particle is present).

The method of the example ensures that the wavelet transform stays close to the "regular image" wavelet transform (detailed later). Thus, as in the "regular" case:
 1. The wavelet transform is calculated by passing the signal through a series of filters (i.e. passing filters over the signal).

2. Each level of the decomposition produces eight subbands from the low-pass subband obtained in the previous level.

The method adds the following:

3. The number of coefficients required to describe the whole image is maintained through each step. In a simplified way, each of the eight subbands contains eight times less (non-null or non-zero) coefficients than the low-pass subband they are coming from.

Maintaining the same number of coefficients before and after each step infers the following properties in the sparse wavelet transformation (if one notes D as the maximum depth of the low-pass subband before one step, with D=N for the first step):

i. The eight subbands produced by the one step are octrees of maximum depth D−1 (more precisely, mappings defined on leaf cells of octrees).

ii. Empty leaves at depth d<D in the low-pass subband produce empty leaves at depth d in the resulting subbands (i.e. no information in these leaves).

iii. A block of eight cells (2×2×2) at depth D (one cell is non empty) produces a cell at depth D−1 in the resulting subbands.

iv. A block of eight cells (2×2×2) at depth D can have from one to eight non-empty cells. Always to maintain the same number of coefficients, a block containing X non-empty cells should produce X non-null coefficients dispatched in the eight resulting subbands (i.e. zeros are forced at this stage, and forced zeros may be coded as null coefficient values or no coefficient value at all).

As we are dealing with a group of 2×2×2 cells, it is relatively efficient to use wavelets with a compact support (width of the convolution kernel) inferior or equal to two. The method may however also work by alternatively using wavelets with a larger compact support. Haar wavelets (compact support=2) are good candidates in the present case, but other predetermined basis of wavelet filters may be implemented. Thus, the method may be applied for a wavelet basis where the wavelets have a compact support inferior or equal to two.

With a "regular image" where each pixel has a defined value for the attribute to encode, one step of decomposition applied to a group of 2×2×2 pixels ($\alpha_{ijk}$, i, j, k $\in\{0,1\}$) produces the following coefficients (assuming that the wavelet filter is separable, which means one can decompose the convolution filter as a product of a convolution along the x axis and a convolution along the y axis):

In the LLL subband: $c_{000}=s(s(s(\alpha_{000}, \alpha_{001}), s(\alpha_{010}, \alpha_{011})), s(s(\alpha_{100}, \alpha_{101}), s(\alpha_{110}\alpha_{111})))$ In the LLH subband: $c_{001}=s(s(d(\alpha_{000}, \alpha_{001}), d(\alpha_{010}, \alpha_{011})), s(d(\alpha_{100}, \alpha_{101}), d(\alpha_{110}\alpha_{111})))$ In the LHL subband: $c_{010}=s(d(s(\alpha_{000}, \alpha_{001}), s(\alpha_{010}, \alpha_{011})), d(s(\alpha_{100}, \alpha_{101}), s(\alpha_{110}\alpha_{111})))$ In the LHH subband: $c_{011}=s(d(d(\alpha_{000}, \alpha_{001}), d(\alpha_{010}, \alpha_{011})), d(d(\alpha_{100}, \alpha_{101}), d(\alpha_{110}\alpha_{111})))$ In the HLL subband: $c_{100}=d(s(s(\alpha_{000}, \alpha_{001}), s(\alpha_{010}, \alpha_{011})), s(s(\alpha_{100}, \alpha_{101}), s(\alpha_{110}\alpha_{111})))$ In the HLH subband: $c_{101}=d(s(d(\alpha_{000}, \alpha_{001}), d(\alpha_{010}, \alpha_{011})), s(d(\alpha_{100}, \alpha_{101}), d(\alpha_{110}\alpha_{111})))$ In the HHL subband: $c_{110}=d(d(s(\alpha_{000}, \alpha_{001}), s(\alpha_{010}, \alpha_{011})), d(s(\alpha_{100}, \alpha_{101}), s(\alpha_{110}\alpha_{111})))$ In the HHH subband: $c_{111}=d(d(d(\alpha_{000}, \alpha_{001}), d(\alpha_{010}, \alpha_{011})), d(d(\alpha_{100}, \alpha_{101}), d(\alpha_{110}\alpha_{111})))$ where d is the wavelet function and s the associated scaling function. In the case of Haar $s(x, y)=\alpha*(x+y)$ and $d(x, y)=\beta*(x-y)$, where $\alpha$ and $\beta$ are normalization factors.

In one step of the sparse wavelet decomposition:

When a block of eight cells (2×2×2) at depth D has 8 non-empty cells, it is considered that one is in the same case as the 3D image. The $\alpha_{ijk}$ are all well-defined and the method can apply the formulas above. In other words, in this case, the method applies predetermined wavelets adapted for a 2D image and having a 2×2 compact support of pixels (e.g. Haar wavelets in the present case), and configured for 3D (i.e. a 2×2×2 compact support of pixels).

When a block of eight cells (2×2×2) at depth D has X (with 0<X<8) non-empty cells. Some $\alpha_{ijk}$ are well-defined (non-empty cells) and some have undefined values (empty cells). As mentioned above, the method ensures that X non-empty cells produce X non-null coefficients dispatched in the eight subbands (property iv. mentioned earlier). Thus, the method forces 8-X $c_{ijk}$ coefficients to be null. An example of the method consists in choosing arbitrary values for the undefined $\alpha_{ijk}$, so that 8-X $c_{ijk}$ coefficients will be null.

With the following notations:

[A]=($\alpha_{ijk}$), [A] is an 8×1 vector.

[C]=($c_{ijk}$), [C] is an 8×1 vector.

[M]=the matrix associated to the transformation defined above. [M] is an 8×8 matrix and

[C]=[M]*[A]

[M] columns are orthogonal (non-null) vectors, due to how discrete wavelet transform works.

In the case of canonical Haar wavelets:

$$[M] = \begin{bmatrix} +1 & +1 & +1 & +1 & +1 & +1 & +1 & +1 \\ +1 & -1 & +1 & -1 & +1 & -1 & +1 & -1 \\ +1 & +1 & -1 & -1 & +1 & +1 & -1 & -1 \\ +1 & -1 & -1 & +1 & +1 & -1 & -1 & +1 \\ +1 & +1 & +1 & +1 & -1 & -1 & -1 & -1 \\ +1 & -1 & +1 & -1 & -1 & +1 & -1 & +1 \\ +1 & +1 & -1 & -1 & -1 & -1 & +1 & +1 \\ +1 & -1 & -1 & +1 & -1 & +1 & +1 & -1 \end{bmatrix}$$

One can reorder elements of [A] and [C], that way:

$$[A] = \begin{bmatrix} A_+ \\ A_- \end{bmatrix} [A_+]$$

are well defined $\alpha_{ijk}$ and [A−] are undefined $\alpha_{ijk}$ $$[C] = \begin{bmatrix} C_+ \\ 0 \end{bmatrix} [C_+]$$

are the X $c_{ijk}$ values we don't force to be null.

[M] matrix must be recalculated: the new [M] is basically equal to the old one multiplied on the left and on the right by permutation matrices. The new [M] columns are still orthogonal (non-null) vectors, because this property is preserved by the multiplication with a permutation matrix.

We can write the new matrix [M] as:

$$[M] = \begin{bmatrix} M1 & M2 \\ M3 & M4 \end{bmatrix}$$

so that [C]=[M]*[A] becomes:
[C₊]=[M1]*[A₊]+[M2]*[A−] and
[0]=[M3]*[A₊]+[M4]*[A−]
If [M4] is invertible:

$$[A-]=-[M4]^{-1}*[M3]*[A_+]$$ (eq.1) and finally $$[C_+]=([M1]-[M2]*[M4]^{-1}*[M3])*[A_+]$$ (eq. 2)

(eq.1) shows that the arbitrary values we should assign to the undefined $\alpha_{ijk}$ to nullify 8-X $c_{ijk}$, is completely determined by the choice of the 8-X $c_{ijk}$ coefficients we want to be null.

(eq.2) shows that if we can choose the $c_{ijk}$ coefficients that should be null so that [M4] is invertible, then we can compute [C₊] which is the results of the step of the decomposition with the formula above.

Finally the only thing that needs to be set in this example of the method is the choice of the 8-X $c_{ijk}$ coefficients that should be null. This selection can be performed in any way. Once this choice is done, the method can compute [M1], [M2], [M3], [M4], and finally [C₊] which is the results of the step of the decomposition.

The following proves that such a valid option always exists, such that the method can always perform the selection.

$$\begin{bmatrix} M2 \\ M4 \end{bmatrix}$$

are 8-X columns of $$[M] \cdot \begin{bmatrix} 0 \\ M4 \end{bmatrix}$$

are the orthogonal projections of these 8-X columns on a subspace S of dimension 8-X. This subspace S is given by the configuration (i.e. the position of the well-defined $\alpha_{ijk}$ and undefined $\alpha_{ijk}$ in the block eight cells (2×2×2)). The choice of 8-X columns of [M] is given by our choice of the 8-X $c_{ijk}$ coefficients we want to force be null. [M4] is invertible if the columns of $$\begin{bmatrix} 0 \\ M4 \end{bmatrix}$$

are linearly independents.

As stated previously, [M] columns are orthogonal (non-null) vectors. These vectors $m_i$ can be normalized to get an orthonormal basis. Orthogonal projection of these basis vectors on S is an overcomplete basis of S. Accordingly we can always find 8-X columns of [M] such as their projections [M4] on S form a complete basis of S, meaning that [M4] is invertible.

The following focuses on how to choose the 8-X $c_{ijk}$ coefficients that should be null.

A block of eight cells (2×2×2) with X well-defined $\alpha_{ijk}$ (with 0<X<8) has $$\binom{8}{X}$$

possible configurations (positions of the X well-defined $\alpha_{ijk}$ among the eight cells). If we consider every possible configurations (with every possible value for X) we have $$254 \left( \sum_{x=1}^{7} \binom{8}{X} \right)$$

possible cases to consider.

To completely define the sparse wavelet decomposition, one has yet to define for each of these 254 possible cases, which are the $c_{ijk}$ coefficients that one wants to be null. It has already been proven that for each configuration there is at least one valid choice. Each time the method encounters a block of eight cells (2×2×2) with X well-defined $\alpha_{ijk}$ (with 0<X<8), the method may simply check in which configuration it is and apply the choice predetermined for this configuration.

In fact for each configuration there are often a lot of valid options. Some options may be more relevant than others. The predetermination of the options may follow the principles discussed below for a high efficiency.

As a lot of configurations are alike, they can be grouped and handled as of the same kind. One can also predetermine a "canonical" option. Such a canonical option is simple and works for a lot of configurations. It can be described as: for each (i,j,k) in $\{0,1\}^3$, if $\alpha_{ijk}$ has an undefined value, then the method forces $c_{ijk}$ to be null. There are few configurations where this is not a valid option (as [M4] not invertible).

It is noted that with a "regular" Haar decomposition, in the LLL subband: $c_{000}$, $\propto \Sigma \alpha_{ijk} \rightarrow$LLL subband stores a kind of average of the 8 pixels. Also, other subbands store the average difference in one direction ($c_{100}$ is almost the average difference along x-axis, $c_{010}$ along y-axis, etc). That means that in a block of eight cells (2×2×2) with X well-defined $\alpha_{ijk}$, the method may keep a non-null value for $c_{000}$ except if the average of well-defined $\alpha_{ijk}$ is null. Thus, in order to keep this behavior the method might keep $c_{000}$ of the 8-X $c_{ijk}$ coefficients that it wants to force to null.

For the following steps (quantization and encoding), as the octree structure is known, the method knows what the multi-resolution analysis structure looks like, and which zeroes in this structure are "forced zeroes" produced in the previous paragraph. So these cells do not need to be quantized and encoded.

At the decompression stage, the decompression method may assume that the octree structure is already decoded (vertex positions have been decoded before and separately from the vertex attributes). When the reverse wavelet transform is performed, the method may consider which values are real non-empty cells and which values are "filled cells", such that these values can be discarded.

An example of adaptation of such a discrete wavelet transformation to a 2D quadtree is now discussed. This example corresponds to the application of the previous example in two dimensions (with a quadtree instead of an octree), the 3D octree case being an extension of this example.

To adapt the discrete wavelet transformation to a quadtree, one can first look at what the multi-resolution analysis should be like. This new discrete wavelet transform applied to a quadtree is also referred to as sparse wavelet transformation. The classical image N*N of wavelet transforms is replaced by a quadtree of maximum depth N.

Each level of the decomposition produces four subbands from the low-pass subband derived during the previous decomposition steps.

To maintain the same number of coefficients before and after the transformation:

1. These subbands are a quadtree of maximum depth N−1.
2. Empty leaves at depth M≠N produce empty leaves.
3. A group of four cells (2×2) (one is non empty) at depth N produces a cell at depth N−1. As there are four subbands, this makes four coefficients. This is illustrated on FIG. 8, which shows from left to right: the original quadtree (black points figure where the data to be compressed has defined values), then multi-resolution analysis after 1/2/3 steps of sparse wavelet transform. The rules 1 to 3 define the structure of the multi-resolution analysis. Each step of the sparse wavelet transformation produces 4 subbands. Each subband is a quadtree.
4. A group of four cells at depth N can have 1, 2, 3 or 4 non-empty cells. Always to maintain the same number of coefficients, a group containing 1/2/3/4 non-empty cells may produce 1/2/3/4 coefficients dispatched in the four subbands. This is illustrated on FIG. 9, which illustrates the scheme of FIG. 8 updated by adding the rule 4. Each step of the sparse wavelet transform maintains the same number of coefficients in this example.

As we are dealing with groups of 2×2 cells, one possibility is to use wavelets with a compact support (width of the convolution kernel) inferior or equal to two, which leads to simple computations. Haar wavelets (compact support=2) are good candidates. The use of wavelets with a larger compact support may be contemplated.

Figure 10:
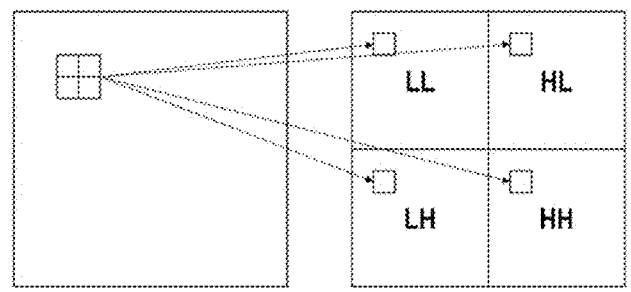

From now on, we assume the wavelets have a compact support inferior or equal to two. With a 2D image where each pixel has a defined value for the attribute to encode, one step of a decomposition applied to a group of 2×2 pixels ($\alpha_{00}$, $\alpha_{01}$, $\alpha_{10}$, $\alpha_{11}$) produces the following coefficients (assuming that the wavelet filter is separable, which means one can decompose the convolution filter as a product of a convolution along the x axis and a convolution along the y axis):

In the LL subband: $c_{00}=s(s(\alpha_{00}, \alpha_{01}), s(\alpha_{10}, \alpha_{11}))$
In the LH subband: $c_{01}=s(d(\alpha_{00}, \alpha_{01}), d(\alpha_{10}, \alpha_{11}))$
In the HL subband: $c_{10}=d(s(\alpha_{00}, \alpha_{01}), s(\alpha_{10}, \alpha_{11}))$
In the NH subband: $c_{11}=d(d(\alpha_{00}, \alpha_{01}), d(\alpha_{10}, \alpha_{11}))$ where d is the wavelet function and s the associated scaling function, as illustrated by FIG. 10 (which shows one step of discreet wavelet transform—with compact support=2—applied to an image; where a block of 2×2 pixels provides one coefficient in each subband). In the case of Haar $s(\alpha_{00}, \alpha_{01})=\alpha*(\alpha_{00}+\alpha_{01})$ and $d(\alpha_{00}, \alpha_{01})=\beta*(\alpha_{00}-\alpha_{01})$, where $\alpha$ and $\beta$ are normalization factors.

With Haar wavelets:
In the LL subband: $c_{00}$ $\alpha(\alpha_{00}+\alpha_{01}+\alpha_{10}+\alpha_{11})\rightarrow$LL subband stores a kind of average of the 4 pixels,
In the LH subband: $c_{01}$ $\alpha(\alpha_{00}-\alpha_{01}+\alpha_{10}-\alpha_{11})\rightarrow$LH subband stores a kind of horizontal difference.
In the HL subband: $c_{10}$ $\alpha(\alpha_{00}+\alpha_{01}-\alpha_{10}-\alpha_{11})\rightarrow$HL subband stores a kind of vertical difference.
In the HH subband: $c_{11}$ $\alpha(\alpha_{00}-\alpha_{01}-\alpha_{10}+\alpha_{11})\rightarrow$HH subband stores a kind of cross difference.

Figure 11:
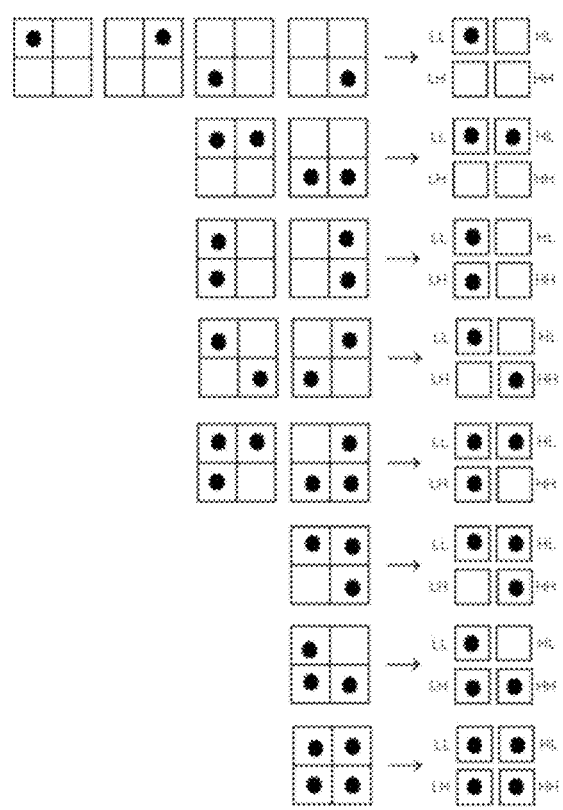

With a quadtree, a group of 2×2 cells at depth N can have 1, 2, 3 or 4 non-empty cells and should produce 1/2/3/4 coefficients dispatched in the four subbands. This is illustrated on FIG. 11, which shows one step of the sparse wavelet transform applied to a block of 2*2 cells, where a group of 1/2/3/4 non-empty cells provides 1/2/3/4 coefficients dispatched in the four subbands.

The idea of the approach is to fill empty cells with value of our choice, which helps produce the minimum number of wavelet coefficients (nullify the subband coefficients we want to be zero).

If it has 4 non-empty cells, we are in the same case as the 2D image.

If it has only 1 non-empty cell (a), we should keep only the "average", i.e. store the value a in the LL subband. It is equivalent to filling empty cells with the same value a and to apply Haar filters normally.

If it has only 2 non-empty cells (a, b), the method should keep only the "average" in the LL subband and the "difference" in one of the other subbands (depending on the relative position of the non-empty cells). If the non-empty cells are in diagonals, it is equivalent to filling empty cells with (a−b)/2 and (b−a)/2 and to apply Haar filters normally. If the non-empty cells are in not diagonals, it is equivalent to filling empty cells with a and b and to apply Haar filters normally.

If it has only 3 non-empty cells (a, b, c), the method should keep only the "average" in the LL subband and two "differences" in one of the other subbands. It is equivalent to filling the empty cell with the value that will nullify the fourth subband coefficient.

The invention claimed is:

1. A computer-implemented method for compressing data representing values of a physical attribute in a predetermined space (S), the method comprising:

providing a signal ($c^{N,000}$) that includes a mapping ($c^{N,000}(\bullet)$) from leaf cells ($\alpha_N^1 \alpha_N^2 \ldots \alpha_N^N \in C(L_N(\text{octree}^N(S)))$, $\alpha_N^{n,n\in(1,\ldots,N)} \in \{0,1\}^3$) of a hierarchical subdivision (octree$^N$(S)) of the predetermined space each onto a respective coefficient ($c^{N,000}(\alpha_N^1 \alpha_N^2 \ldots \alpha_N^N)$) representative of a value of the physical attribute at the respective leaf cell;

determining a discrete wavelet transform of the signal with a predetermined basis of wavelet convolution filters ($f_I(d,s)$, $I \in \{0,1\}^3$ or $I \in \{L,H\}^3$), thereby recursively determining subbands ($c^{D,I}$, $I \in \{0,1\}^3$ or $I \in \{L,H\}^3$), including a low-pass subband ($c^{D,000}$), by passing, at each current recursion ($D \in \{N−1, N−2, \ldots, 0\}$), each wavelet convolution filter ($f_I$) over the low-pass subband)($c^{D+1,000}$) of the previous recursion (D+1), starting from the signal ($c^{N,000}$);

the subbands ($c^{D,I}$) determined at a current recursion (D) each including a respective mapping ($c^{D,I}(\bullet)$) from leaf cells ($\alpha_D^1 \alpha_D^2 \ldots \alpha_D^D \in C(L_D(\text{octree}^D(S)))$, $\alpha_D^{n,n\in\{1,\ldots,D\}} \in \{0,1\}^3$), of a same hierarchical subdivision (octree$^D$(S)) of which the hierarchical subdivision (octree$^{D+1}$(S)) of the previous recursion (D+1) is a subdivision, each given leaf cell ($\alpha_D^{1*} \alpha_D^{2*} \ldots \alpha_D^{D*}$) being mapped onto a respective coefficient ($c^{D,I}(\alpha_D^{1*} \alpha_D^{2*} \ldots \alpha_D^{D*})$) determined, during the passing of a respective wavelet convolution filter ($f_I$) over the low-pass subband)($c^{D+1,000}$) of the previous recursion (D+1), by applying the respective wavelet convolution filter ($f_I$) to the coefficients ($c^{D+1,000}(\alpha_D^{1*} \alpha_D^{2*} \ldots \alpha_D^{D*} \alpha_{D+1}^{D+1})$) of the low-pass subband ($c^{D+1,000}$) of the previous recursion (D+1) mapped onto from leaf cells ($\alpha_D^{1*} \alpha_D^{2*} \ldots \alpha_D^{D*} \alpha_{D+1}^{D+1} \in C(L_{D+1}(\text{octree}^{D+1}(S)))$, $\alpha_{D+1}^{D+1} \in \{0,1\}^3$)) of the hierarchical subdivision (octree$^{D+1}$(S)) of the previous recursion (D+1) that subdivide the given leaf cell ($\alpha_D^{1*} \alpha_D^{2*} \ldots \alpha_D^{D*}$); and encoding the determined discrete wavelet transform.

2. The method of claim 1, wherein the wavelet convolution filters ($f_I$) have a compact support ($\{0,1\}^3$).

3. The method of claim 2, wherein at least at one given recursion (D) the passing encounters at least one leaf cell $(\alpha_{D+1}^{1'}\alpha_{D+1}^{2'} \ldots \alpha_{D+1}^{D+1'} \notin C(L_{D+1}(\text{octree}^{D+1}(S))))$ of the low-pass subband $(c^{D+1,000})$ of the previous recursion (D+1) mapped onto no coefficient, the determining of a discrete wavelet transform including assigning a value $(c'^{D+1,000}(\alpha_{D+1}^{1'}\alpha_{D+1}^{2'} \ldots \alpha_{D+1}^{D+1'}))$ to the encountered cell, the assigned value being inputted to each of the wavelet convolution filters.

4. The method of claim 3, wherein the assigned value is determined with respect to a criterion related to forcing one or more zeros in the subbands determined at the given recursion (D).

5. The method of claim 4, wherein the criterion $(|c^{N,000}(\bullet)|=\Sigma_{\in\{0,1\}^3, D\in\{N-1, N-2, \ldots, 0\}}|c^{D,J}(\bullet)|)$ is that the number of coefficients of all the subbands determined at the given recursion (D) not forced to zero is equal to the number of coefficients of the low-pass subband of the previous recursion (D+1) not forced to zero.

6. The method of claim 2, wherein the size of the compact support is smaller or equal to the minimal value of the divider of the hierarchical subdivision.

7. The method of claim 6, wherein the divider of the hierarchical subdivision has a constant value ($2^3$) and the size of the compact support is equal to the constant value of the divider of the hierarchical subdivision.

8. A computer-implemented method for decompressing a compressed signal obtainable by a computer-implemented method for compressing data representing values of a physical attribute in a predetermined space, the method comprising:

providing a signal that includes a mapping from leaf cells of a hierarchical subdivision of the predetermined space each onto a respective coefficient representative of a value of the physical attribute at the respective leaf cell;

determining a discrete wavelet transform of the signal with a predetermined basis of wavelet convolution filters, thereby recursively determining subbands, including a low-pass subband, by passing, at each current recursion, each wavelet convolution filter over the low-pass subband of the previous recursion, starting from the signal, the subbands determined at a current recursion each including a respective mapping from leaf cells, of a same hierarchical subdivision of which the hierarchical subdivision of the previous recursion is a subdivision, each given leaf cell being mapped onto a respective coefficient determined, during the passing of a respective wavelet convolution filter over the low-pass subband of the previous recursion, by applying the respective wavelet convolution filter to the coefficients of the low-pass subband of the previous recursion mapped onto from leaf cells of the hierarchical subdivision of the previous recursion that subdivide the given leaf cell; and encoding the determined discrete wavelet transform.

9. A device comprising:

a non-transitory memory having recorded thereon a computer program comprising instructions for performing a computer-implemented method for compressing data representing values of a physical attribute in a predetermined space, the method comprising:

providing a signal that includes a mapping from leaf cells of a hierarchical subdivision of the predetermined space each onto a respective coefficient representative of a value of the physical attribute at the respective leaf cell;

determining a discrete wavelet transform of the signal with a predetermined basis of wavelet convolution filters, thereby recursively determining subbands, including a low-pass subband, by passing, at each current recursion, each wavelet convolution filter over the low-pass subband of the previous recursion, starting from the signal, the subbands determined at a current recursion each including a respective mapping from leaf cells, of a same hierarchical subdivision of which the hierarchical subdivision of the previous recursion is a subdivision, each given leaf cell being mapped onto a respective coefficient determined, during the passing of a respective wavelet convolution filter over the low-pass subband of the previous recursion, by applying the respective wavelet convolution filter to the coefficients of the low-pass subband of the previous recursion mapped onto from leaf cells of the hierarchical subdivision of the previous recursion that subdivide the given leaf cell; and encoding the determined discrete wavelet transform.

10. A non-transitory data storage medium having stored thereon a computer program comprising instructions for performing the computer-implemented method for compressing data representing values of the physical attribute in the predetermined space according to claim 8.

11. The device of claim 9, further comprising a processor coupled to the memory, the device being a computer system.

12. A device comprising:

a non-transitory memory having recorded thereon a computer program comprising instructions for performing a computer-implemented method for decompressing a compressed signal obtainable by a computer-implemented method for compressing data representing values of a physical attribute in a predetermined space, the method comprising:

providing a signal that includes a mapping from leaf cells of a hierarchical subdivision of the predetermined space each onto a respective coefficient representative of a value of the physical attribute at the respective leaf cell;

determining a discrete wavelet transform of the signal with a predetermined basis of wavelet convolution filters, thereby recursively determining subbands, including a low-pass subband, by passing, at each current recursion, each wavelet convolution filter over the low-pass subband of the previous recursion, starting from the signal, the subbands determined at a current recursion each including a respective mapping from leaf cells, of a same hierarchical subdivision of which the hierarchical subdivision of the previous recursion is a subdivision, each given leaf cell being mapped onto a respective coefficient determined, during the passing of a respective wavelet convolution filter over the low-pass subband of the previous recursion, by applying the respective wavelet convolution filter to the coefficients of the low-pass subband of the previous recursion mapped onto from leaf cells of the hierarchical subdivision of the previous recursion that subdivide the given leaf cell; and encoding the determined discrete wavelet transform.

13. A non-transitory data storage medium having stored thereon a computer program comprising instructions for performing the computer-implemented method for decompressing the compressed signal obtainable by the computer-implemented method for compressing data representing values of the physical attribute in a predetermined space according to claim 8.

14. The device of claim 12, further comprising a processor coupled to the memory, the device being a computer system.

\* \* \* \* \*

UNITED STATES PATENT AND TRADEMARK OFFICE
CERTIFICATE OF CORRECTION

PATENT NO. : 10,410,377 B2
APPLICATION NO. : 15/702042
DATED : September 10, 2019
INVENTOR(S) : Jean-Julien Tuffreau et al.

Page 1 of 1

It is certified that error appears in the above-identified patent and that said Letters Patent is hereby corrected as shown below:

On the Title Page

Item (73), the Assignee is incorrect. Item (73) should read:
-- (73) Assignee: DASSAULT SYSTEMES, Velizy Villacoublay, (FR) --

Signed and Sealed this
Fourteenth Day of April, 2020

Andrei Iancu
*Director of the United States Patent and Trademark Office*